(12) United States Patent
Udagawa et al.

(10) Patent No.: US 6,195,125 B1
(45) Date of Patent: *Feb. 27, 2001

(54) PIXEL SHIFTING IMAGE SENSOR WITH A DIFFERENT NUMBER OF IMAGES SENSED IN EACH MODE

(75) Inventors: Yoshiro Udagawa, Saitama-ken; Masato Ikeda, Higashikurume, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/695,233

(22) Filed: Aug. 7, 1996

(30) Foreign Application Priority Data

| Aug. 11, 1995 | (JP) | 7-205888 |
| Aug. 15, 1995 | (JP) | 7-208137 |
| Jan. 9, 1996 | (JP) | 8-001334 |

(51) Int. Cl.[7] .......................... H04N 5/228; H04N 5/225
(52) U.S. Cl. ........................................... 348/222; 348/218
(58) Field of Search .................................. 348/222, 224, 348/223, 266, 272, 273, 279, 348

(56) References Cited

U.S. PATENT DOCUMENTS

| 4,618,990 | * | 10/1986 | Sieb, Jr. et al. ................ 382/43 |
| 4,882,619 | * | 11/1989 | Hasegawa et al. ............... 358/55 |
| 5,402,171 | * | 3/1995 | Tagami et al. .................. 348/219 |
| 5,418,565 | * | 5/1995 | Smith .............................. 348/273 |
| 5,541,648 | * | 7/1996 | Udagawa et al. ............... 348/222 |
| 5,734,424 | * | 3/1998 | Sasaki ............................. 348/222 |
| 5,764,285 | * | 6/1998 | Ochi et al. ...................... 348/222 |
| 5,781,236 | * | 7/1998 | Shinbori et al. ................. 348/342 |
| 5,907,353 | * | 5/1999 | Okauchi .......................... 348/218 |

FOREIGN PATENT DOCUMENTS

| 0 669 757 | | 8/1995 | (EP) . | |
| 669757 | * | 8/1995 | (EP) | H04N/5/232 |
| 50-17134 | | 6/1975 | (JP) . | |
| 64-863 | | 1/1989 | (JP) . | |

OTHER PUBLICATIONS

European Search Report, dated May 21, 1999.

* cited by examiner

Primary Examiner—Wendy Garber
Assistant Examiner—Alicia M Harrington
(74) Attorney, Agent, or Firm—Morgan & Finnegan, LLP

(57) ABSTRACT

An image sensing apparatus has a plurality of image sensing modes each of which performs image sensing operation using different pixel shifting method. One of these image sensing modes is selected through a selection unit in accordance with an object to be sensed, and a plurality of images of the object are sensed in image sensing position arrays on the basis of the selected image sensing mode. A combining unit combines the plurality of sensed images to obtain a single still image of high resolution.

23 Claims, 25 Drawing Sheets

FIG. 2

| C | G | Y | C | G | Y |
|---|---|---|---|---|---|
| C | G | Y | C | G | Y |
| C | G | Y | C | G | Y |
| C | G | Y | C | G | Y |
|   |   |   |   |   |   |

○ LUMINANCE CARRIER GENERATION POINT
△ COLOR CARRIER GENERATION POINT

FIG. 12
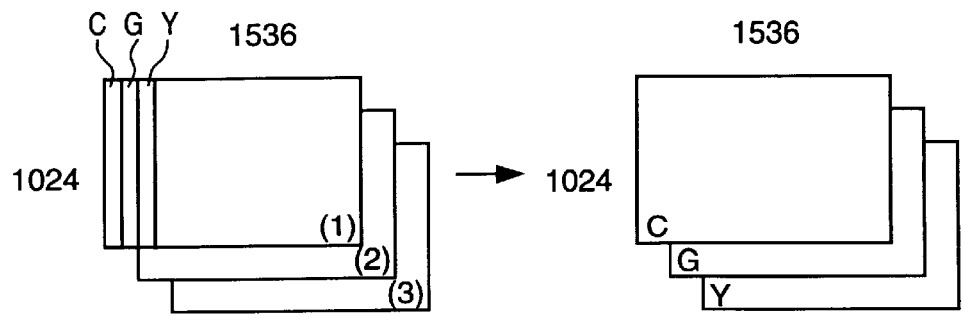
FIG. 13A   FIG. 13B
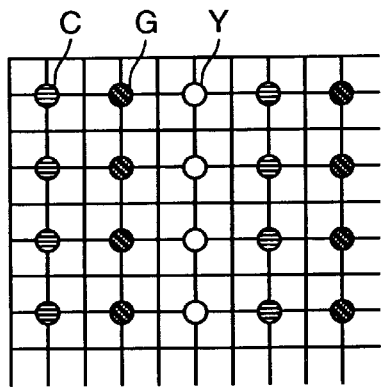   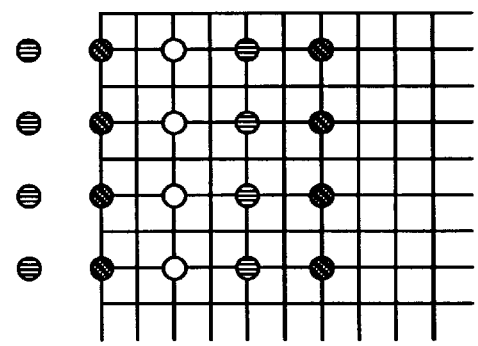
FIG. 14
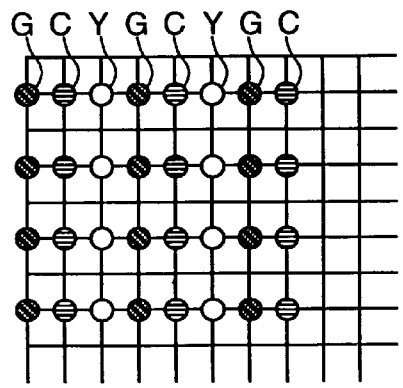

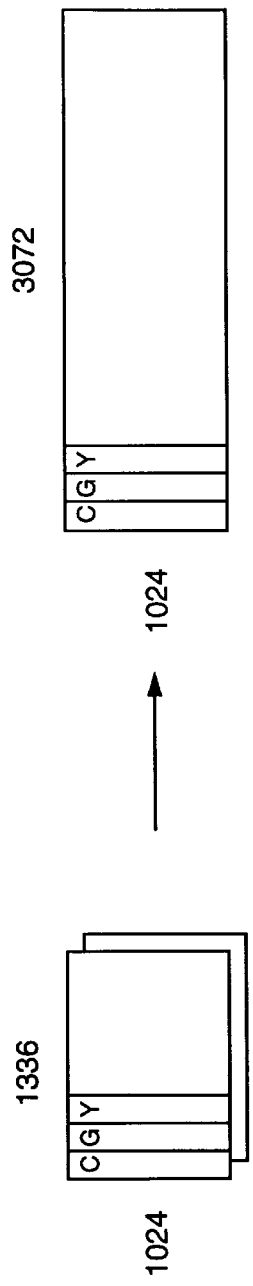
F I G. 15A
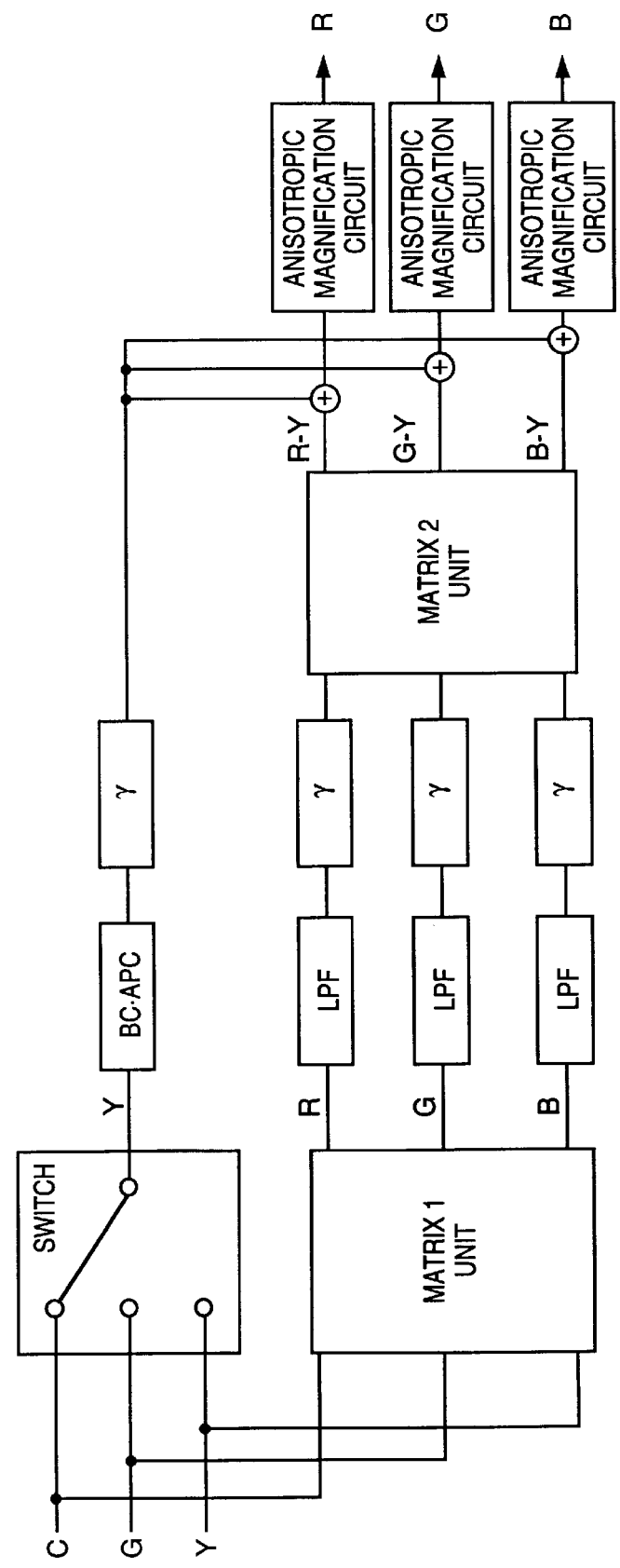
F I G. 15B

IMAGE 1

| Cy1 | Ye1 |
|---|---|
| Mg1 | G1 |
| Cy1 | Ye1 |
| G1 | Mg1 |

P/2

IMAGE 2

| Cy2 | Ye2 |
|---|---|
| Mg2 | G2 |
| Cy2 | Ye2 |
| G2 | Mg2 |

P/2

IMAGE 3

P/2

| Cy3 | Ye3 |
|---|---|
| Mg3 | G3 |
| Cy3 | Ye3 |
| G3 | Mg3 |

IMAGE4

P/2

| Cy4 | Ye4 |
|---|---|
| Mg4 | G4 |
| Cy4 | Ye4 |
| G4 | Mg4 |

FIG. 21
| Cy1 | Cy2 | Ye1 | Ye2 |
|---|---|---|---|
| Cy4 | Cy3 | Ye4 | Ye3 |
| Mg1 | Mg2 | G1 | G2 |
| Mg4 | Mg3 | G4 | G3 |
| Cy1 | Cy2 | Ye1 | Ye2 |
| Cy4 | Cy3 | Ye4 | Ye3 |
| G1 | G2 | Mg1 | Mg2 |
| G4 | G3 | Mg4 | Mg3 |
FIG. 22
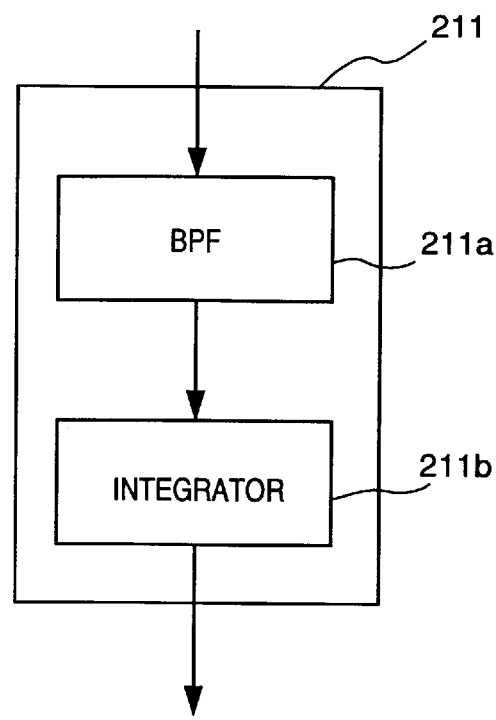
FIG. 23
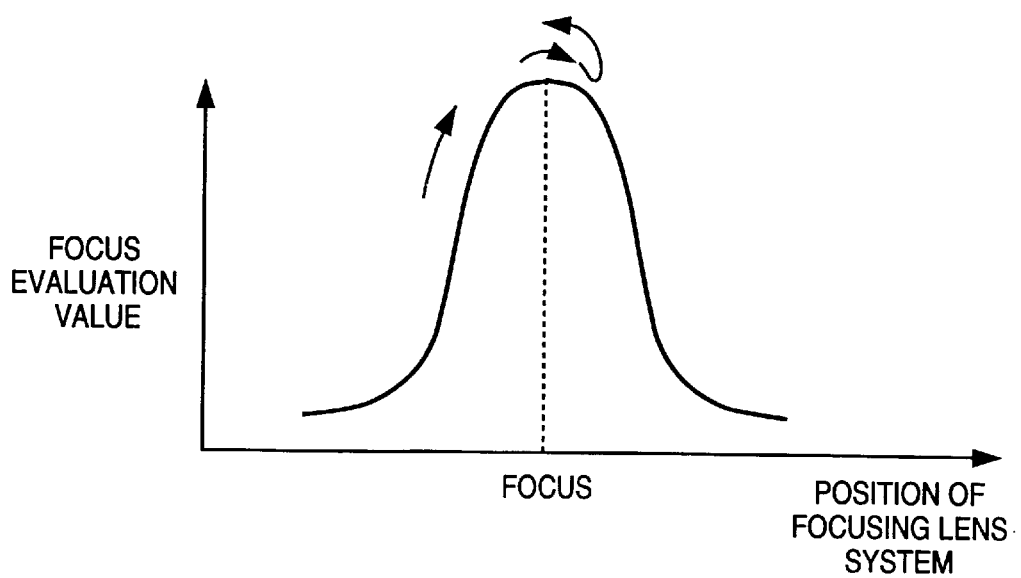

FIG. 25

|  | | | | | | | |
|---|---|---|---|---|---|---|---|
| 1ST LINE | C11 | R11 | G21 | R21 | G31 | R31 | G |
| 2ND LINE | B12 | G12 | B22 | G22 | B32 | G32 | B |
| 3RD LINE | G13 | R13 | G23 | R23 | G33 | R33 | G |
| 4TH LINE | B14 | G14 | B24 | G24 | B34 | G34 | B |
| 5TH LINE | G15 | R15 | G25 | R25 | G35 | R35 | G |
| 6TH LINE | B16 | G16 | B26 | G26 | B36 | G36 | B |

|   |   |   |   |   |   |   |
|---|---|---|---|---|---|---|
| G | R | G | R | G | R | G |
| B | G | B | G | B | G | B |
| G | R | G | R | G | R | G |
| B | G | B | G | B | G | B |
| G | R | G | R | G | R | G |

ODD FIELD

EVEN FIELD

FIG. 32A

FIRST IMAGE DATA

| G | G | G | G | G | G |
|---|---|---|---|---|---|
| G | G | G | G | G | G |
| G | G | G | G | G | G |
| G | G | G | G | G | G |
| G | G | G | G | G | G |
| G | G | G | G | G | G |

FIG. 32B

SECOND IMAGE DATA

| R | R | R | R | R | R |
|---|---|---|---|---|---|
| B | B | B | B | B | B |
| R | R | R | R | R | R |
| B | B | B | B | B | B |
| R | R | R | R | R | R |
| B | B | B | B | B | B |

○ G SIGNAL CARRIER GENERATION POINT
△ R,B SIGNAL CARRIER GENERATION POINT

| C | Y | C | Y |
|---|---|---|---|
| G | M | G | M |
| C | Y | C | Y |
| G | M | G | M |
|   |   |   |   |

PIXEL SHIFTING IMAGE SENSOR WITH A DIFFERENT NUMBER OF IMAGES SENSED IN EACH MODE

BACKGROUND OF THE INVENTION

The present invention relates to an image sensing apparatus and method using a solid-state image sensing device, such as CCD, and more particularly, to an image sensing apparatus and method realizing high-resolution image sensing by using "pixel shifting technique" and a method of dealing with obtained data of the plurality of images sensed by using the pixel shifting technique.

Conventionally, there are the following methods for increasing image sensing resolution adopted by an image sensing apparatus using a solid-state image sensing device.

(a). Increase the density of pixels in the image sensing device.

(b). Use a plurality of image sensing devices.

(c). Use pixel shifting technique.

Regarding method (a), the method greatly depends upon semiconductor manufacturing technique, thus it does not improve quickly. Further, although the semiconductor manufacturing technique improves, the price of the image sensing device will increase. Regarding method (b), it can be realized relatively easily by using an optical prism, or the like. However, three image sensing devices as well as a large optical member, such as the optical prism, for separating incoming light into three color components which travel different paths from each other are necessary. As a result, the cost for manufacturing an image sensing apparatus increases.

Because of the problems of using methods (a) and (b), method (c), namely pixel shifting technique, has been used for realizing high-resolution image sensing. The pixel shifting technique is that a plurality of images of an object are sensed as shifting image formation positions on the image sensing device, and combined to produce a single high-resolution still image. This technique is disclosed in the Japanese Patent Publication No. 50-17134, for example.

As for pixel shifting technique using a single image sensing device, the one disclosed in the Japanese Patent Publication No. 1-863 is known. This discloses a technique to obtain a plurality of images sensed by moving an optical system, image sensing device or an object by a predetermined amount, then combine the obtained plurality of images to produce a single image of high resolution.

However, in the aforementioned conventional pixel shifting techniques, only basic techniques are suggested. Especially, when the pixel shifting is performed by using a single image sensing device, since a color filter is attached, no concrete way of shifting pixels has been described. Furthermore, there were no description on data handling, such as how color processes are performed on obtained image data and whether the high resolution still image sensing is performed while sensing a moving image or not, which have been problems upon developing an image sensing apparatus in practice.

Further, it is possible to obtain images of different resolution depending upon how the pixels are shifted, however, there was no suggestion to change the ways of shifting pixels in accordance with characteristics of the object.

Furthermore, the image sensing apparatus using a solid-state image sensing device focuses on the object, measures light exposure, and adjusts white balance for each sensed image. However, focusing on the object, measurement of light exposure, and correction of white balance have not been exclusively considered for the pixel shifting technique in which a plurality of images are sensed by shifting the relative positions between the image sensing device and the object in the horizontal direction, vertical direction and oblique direction, and combined into a single image of high quality.

In a case of sensing a plurality of images needed for producing a combined high resolution image by using the pixel shifting technique, still life, a stationary object, is generally sensed in most of the cases, and conditions for sensing the images seldom change. Thus, if the focusing on the object, measurement of light exposure, and white balance correction are performed each time when sensing an image of the object to be used for generating a single image of high resolution, errors in measurement and in operation of each detection device may result in changing conditions for sensing the images, thereby making it difficult to combine the plurality of obtained images into a single image of high resolution.

Further, for performing the focusing on the object, measurement of light exposure and white balance correction for each image sensing operation, it is necessary to operate driving circuits. Therefore, time as well as energy of a battery are wasted.

SUMMARY OF THE INVENTION

The present invention has been made in consideration of the above situation, and has as its object to provide an image sensing apparatus and method having a plurality of image sensing modes for shifting a solid-state image sensing device to different positions so as to be able to obtain images of different resolutions, as well as to provide a data handling method of image data obtained by the aforesaid image sensing apparatus.

According to the present invention, the foregoing object is attained by providing an image sensing apparatus which obtains an image of high resolution by using pixel shifting technique, comprising: image sensing means for sensing an image of an object to obtain image data; shifting means for shifting image formation position of the image of the object on the image sensing means; selection means for selecting one of a plurality of image sensing modes each of which performs image sensing operation using different pixel shifting method; and combining means for combining a plurality of sensed images.

With the aforesaid configuration, it is possible for a user to select an image sensing mode which is suitable to an object to be sensed.

It is another object of the present invention to provide an image sensing apparatus capable of making it easier to combine a plurality of images and obtaining an image of high quality with low power consumption.

According to the present invention, the foregoing object is attained by providing an image sensing apparatus which obtains an image of high resolution by using pixel shifting technique, comprising: focus control means for controlling focus of image sensing means; exposure control means for controlling exposure of the image sensing means; white balance control means for controlling white balance of image data obtained by the image sensing means; and storage means for storing conditions controlled by the focus control means, the exposure control means and the white balance control means during a first image sensing operation, wherein second and later image sensing operation are performed under the conditions stored in the storage means.

It is still another object of the present invention to provide an image sensing apparatus capable of obtaining a still image of high resolution while sensing a moving image by using pixel shifting technique.

According to the present invention, the foregoing object is attained by providing an image sensing apparatus which obtains an image of high resolution by using pixel shifting technique, comprising: image sensing means for sensing an image of an object to obtain image data; shifting means for shifting image formation positions of the image of the object on the image sensing means by a predetermined amount; read control means for controlling timing of reading image data from the image sensing means so as to compensate the shifted predetermined amount; and combining means for combining a plurality of sensed images.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is an explanatory view showing an arrangement of color filter chips, composing a color filter, used in the first embodiment;

FIG. 12 is an explanatory view showing rearrangement of image data in the mode 3;

FIGS. 13A and 13B are explanatory views showing image sensing point arrays in mode 4;

FIG. 14 is an explanatory view showing combined image sensing point array in the mode 4;

FIGS. 15A and 15B are explanatory views showing signal processing in the mode 4;

FIGS. 20A to 20F are explanatory views showing how pixels are shifted and resulted image sensing points with reference to first image sensing points;

FIG. 21 is an explanatory view showing a combined image sensing point array of high-resolution image data obtained as a result of pixel shifting;

FIG. 22 is a block diagram illustrating a configuration of a focus detector;

FIG. 23 is a graph showing a characteristic between positions of lenses for focusing and focus evaluation value upon focusing processing;

FIG. 25 is an explanatory view showing an arrangement of color filter chips, composing a color filter, used in the third embodiment;

FIGS. 32A and 32B are explanatory views showing arrangements of combined image data for each field;

DETAILED DESCRIPTION OF THE PREFERRED EMBODIMENTS

Preferred embodiments of the present invention will be described in detail in accordance with the accompanying drawings.

[First Embodiment]

Figure 1:
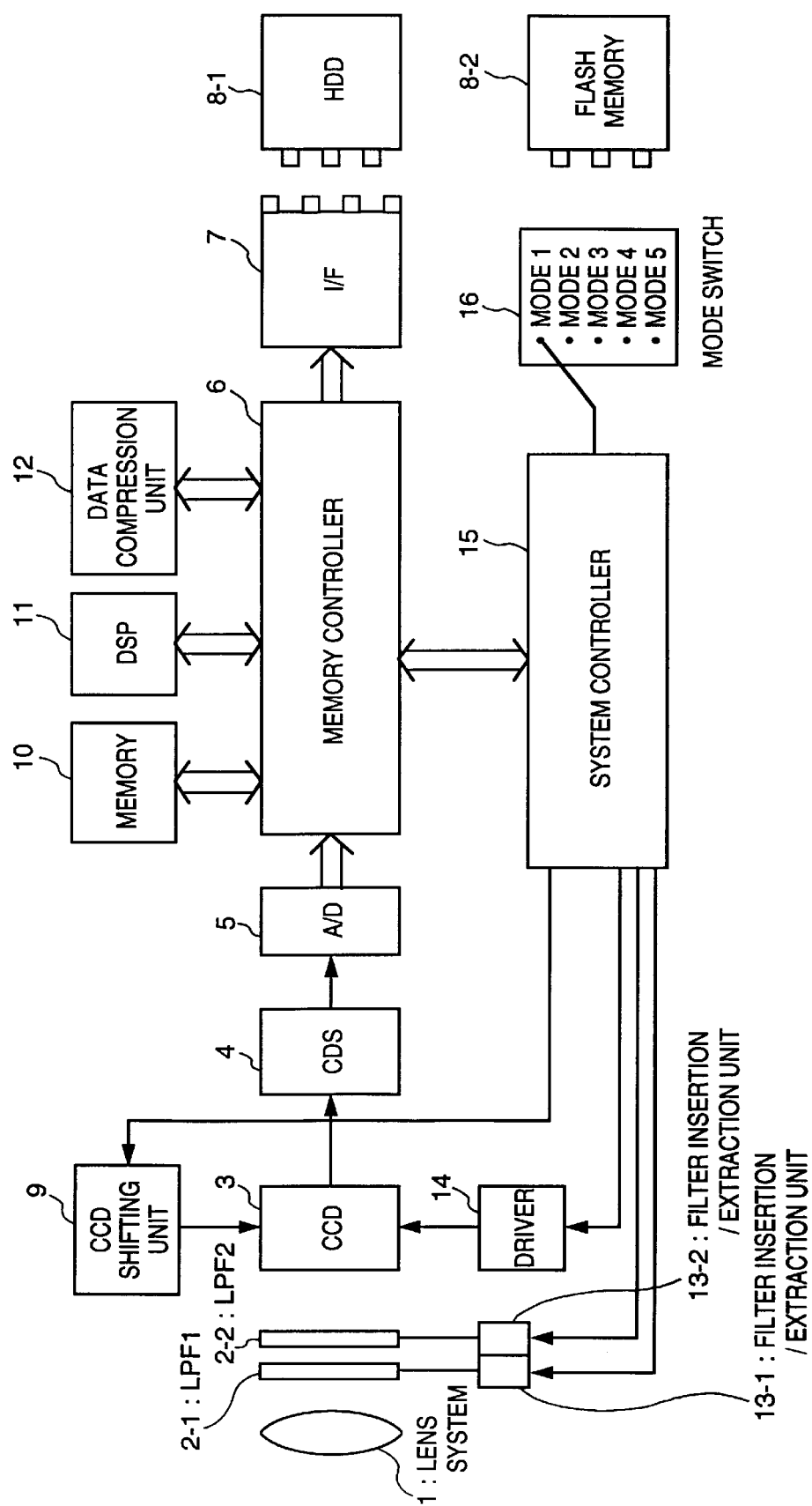
FIG. 1 is a block diagram illustrating a configuration of an image sensing apparatus according to the first embodiment of the present invention.

FIG. 1 is a block diagram illustrating a configuration of an image sensing apparatus, a digital still camera, according to a first embodiment of the present invention. The configuration and operation of the digital still camera are explained below with reference to FIG. 1.

First, when a storage medium 8-1 or 8-2 for storing image data of sensed images is connected to an interface 7 of the digital still camera, the system controller 15 determines speed for writing and reading to/from the connected storage medium 8-1 or 8-2. A compression ratio for compressing image data is determined in accordance with the determined speed. This operation will be explained later in detail.

Next, before starting sensing images, an image sensing mode is manually selected by using a mode switch 16. There are five modes provided in the first embodiment, and they are:

mode 1 three high resolution image sensor mode
mode 2 single high resolution image sensor mode
mode 3 three normal resolution image sensor mode
mode 4 single normal resolution image sensor mode 1
mode 5 single normal resolution image sensor mode 2

Each of these modes will be described later in detail.

When a shutter trigger (not shown) is turned ON, image sensing operation starts.

An image of an object (not shown) passes through a lens system 1 and an optical low pass filter (LPF) set 1 or 2 (referred by 2-1 and 2-2 in FIG. 1), then forms as an image on a CCD 3. Each of the optical LPF sets 1 and 2 is composed of a single or a plurality of quartz plates, and inserted in or extracted out of the light path of the image of the object by a filter insertion/extraction unit 13-1 or 13-2 under control of the system controller 15 in accordance with the mode selected. The optical image formed on the CCD 3 is outputted as electric signals, then reset noises included in the electric signals of the image are reduced by a correlated double sampling (CDS) circuit 4, then the image signals are digitized by an analog-digital (A/D) converter 5. Further, the digital image signals are temporarily stored in a memory 10 through a memory controller 6.

In the first embodiment, the CCD 3 has a 1536×1024 pixel array (about 1,500,000 pixels), which are covered with a color filter of complementary colors arranged in stripe. Further, the A/D converter 5 has linear and 10-bit characteristics.

When a plurality number of images are sensed in an image sensing mode selected as above, in a case where an amount of data of the sensed images exceeds the capacity of the memory 10, the data of the sensed images are moved to the connected storage medium 8-1 or 8-2. Following is an explanation of moving the data.

Image data (unprocessed data read from the single CCD) of 10-bit depth stored in the memory 10 enters a data compression unit 12 (based on JPEG) via a digital signal processor (DSP) 11. In the DSP 11, the image data of 10-bit depth is converted into 8-bit data after γ correction (γ=0.45). The compression ratio is set in advance in the data compression unit 12, dependent upon the connected storage medium 8-1 or 8-2. The data entered the data compression unit 12 is compressed with the compression ratio, and stored in the storage medium 8-1 or 8-2.

Next, the second image of the object, among the plurality of images to be sensed, is sensed. Before sensing the second image, the optical LPF set 1 or 2 is inserted/extracted in accordance with the selected image sensing mode. Thereafter, by driving a CCD shifting unit (e.g., piezoelectric element) 9, the relative position of the CCD 3 is moved in the horizontal direction or the vertical direction, then the second image is sensed. The flow of data of the second image is same as that of the data of the first image. The aforesaid processes are repeated a predetermined number of times, and compressed data of a plurality of images sensed as shifting the CCD 3 are stored in the storage medium 8-1 or 8-2.

After the last image of the object is sensed, a process of combining the data of the plurality of images starts. Necessary portions of data is read out from the storage medium 8-1 or 8-2 and decompressed by the data compression unit 12, then converted into 10-bit linear data by the DSP 11. Thereafter, the order of the image data are rearranged in accordance with the positions of the CCD 3 in pixel shifting. Further, the image data is applied with various signal processes, such as color conversion, aperture correction and base clipping, then compressed again by the data compression unit 12 if necessary, and written to the storage medium 8-1 or 8-2. The compression ratio at this time may be linked to the compression ratio used when initially storing the image data in the storage medium 8-1 or 8-2, or may be determined independently.

Note, the data to be processed is often a great amount, thus the process of combining the stored data is performed by reading image data from the storage medium 8-1 or 8-2 by block, in other words, by reading the image data for corresponding area of each image data.

<Patterns of Pixel Shifting>

Next, patterns of pixel shifting in each image sensing mode will be described in detail.

Mode 1

Figure 2:
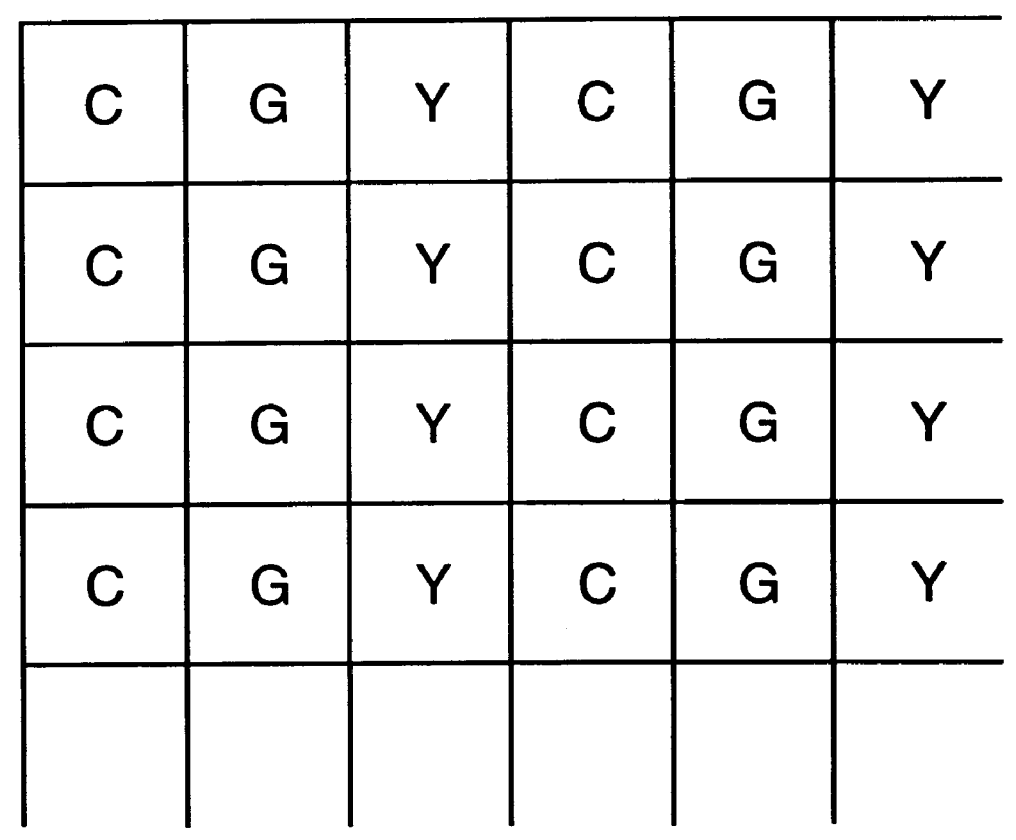

FIGS. 3A to 3F are explanatory views showing image sensing point arrays in the mode 1. In the first embodiment, color filter chips of C (cyan), G (green) and Y (yellow) are arranged in vertical stripe, as shown in FIG. 2, and provided on the CCD 3 having 1536×1024 pixels (about 1,500,000 pixels) as an on-chip filter. A pixel shifting pattern by using the above CCD 3 will be described with reference to FIGS. 3A to 3F. Image sensing points to which color filter chips of each color (C, G and Y) contribute are shown by different kinds of circles for making it easier to understand.

Figure 3A:
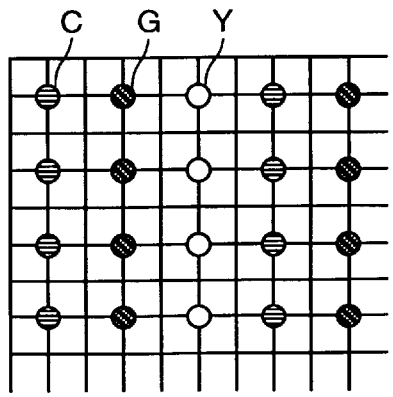
FIGS. 3A to 3F are explanatory views showing image sensing point arrays in mode 1.
Figure 3B:
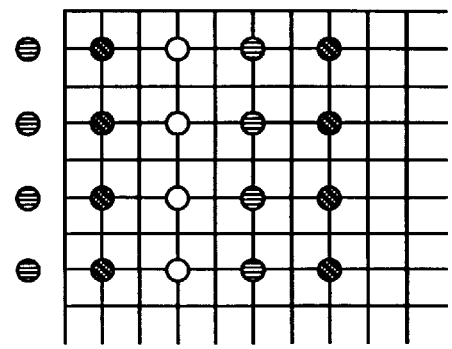
Figure 3C:
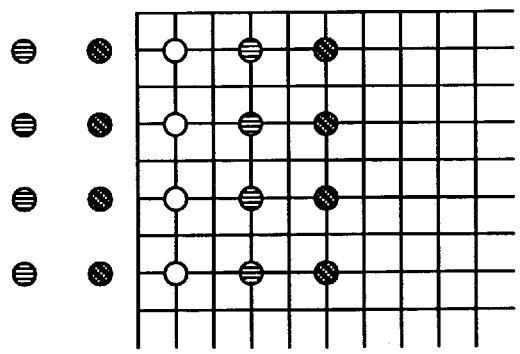
Figure 3D:
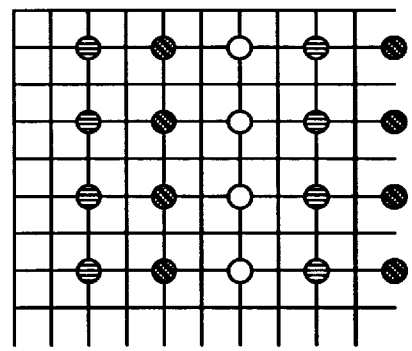
Figure 3E:
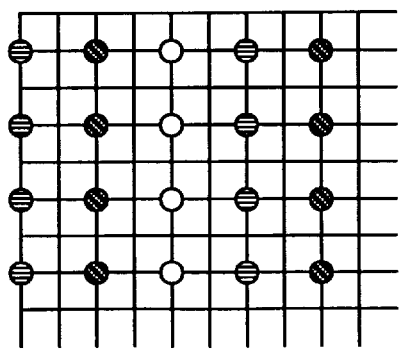
Figure 3F:
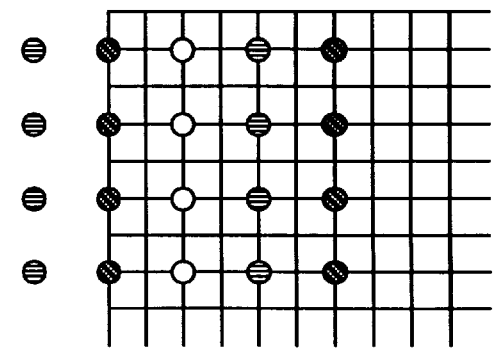

At first, the first image is sensed (FIG. 3A). The image sensing point array where the first image is sensed are referred as "reference image sensing point array", hereinafter. Next, the CCD 3 is shifted by the distance corresponding to the interval between pixels ("pitch") in the horizontal direction, then the second image is sensed. In the second image, image sensing points contributed by C in the first image are contributed by G (FIG. 3B). Similarly, the CCD 3 is further shifted by a pitch in the horizontal direction, then the third image is sensed. In the third image, the points contributed by G in the second image are contributed by Y (FIG. 3C). Next, the fourth image is sensed in image sensing point array which is at a position shifted by a half pitch in the horizontal direction from the position of reference image sensing point array shown in FIG. 3A (FIG. 3D). Then, the fifth image is sensed in image sensing point array which is at a position shifted by a pitch in the horizontal direction from the position of the image sensing point array for the fourth image, shown in FIG. 3D. Accordingly, the points contributed by C in the fourth image are contributed by G in the fifth image (FIG. 3E). Further, the sixth image is sensed in image sensing point array which is at a position shifted by a pitch in the horizontal direction from the position of the image sensing point array for the fifth image shown in FIG. 3E (FIG. 3F). The image data of the six sensed images corresponds to data of images of three colors, C, G and Y, each sensed at image sensing points of a CCD having about 1,500,000 pixels and at their interpolation points in the horizontal direction.

The seventh image is sensed in image sensing point array which is at a position shifted by a half pitch in the vertical direction from the position of the reference image sensing point array. Thereafter, the CCD 3 is further shifted in the horizontal direction from the position where the seventh image is sensed to obtain five more images, and the method of shift in the horizontal direction is same as that explained with reference to FIGS. 3A to 3F.

The image data of another six sensed images corresponds to data of images of three colors, C, G and Y, each sensed at image sensing points of a CCD having about 1,500,000 pixels shifted by a half pitch in the vertical direction with respect to the reference image sensing array and at their interpolation points in the horizontal direction.

Therefore, the image data of twelve sensed images corresponds to data of images of three colors, C, G and Y, each sensed in the reference image sensing point array of a CCD having about 1,500,000 pixels, their interpolation points in the horizontal direction, their interpolation points in the vertical direction and image sensing points shifted by a half pitch both in the horizontal and vertical directions from the reference image sensing point array. This is equivalent to data of images of three colors each sensed by about 6,000,000 pixels of a CCD. In other words, the data obtained by sensing twelve images is equivalent to data obtained with three CCDs, each of which has about 6,000,000 pixels, in a single image sensing process. Therefore, the mode 1 is also called as "three high resolution image sensor mode".

Figure 4A:
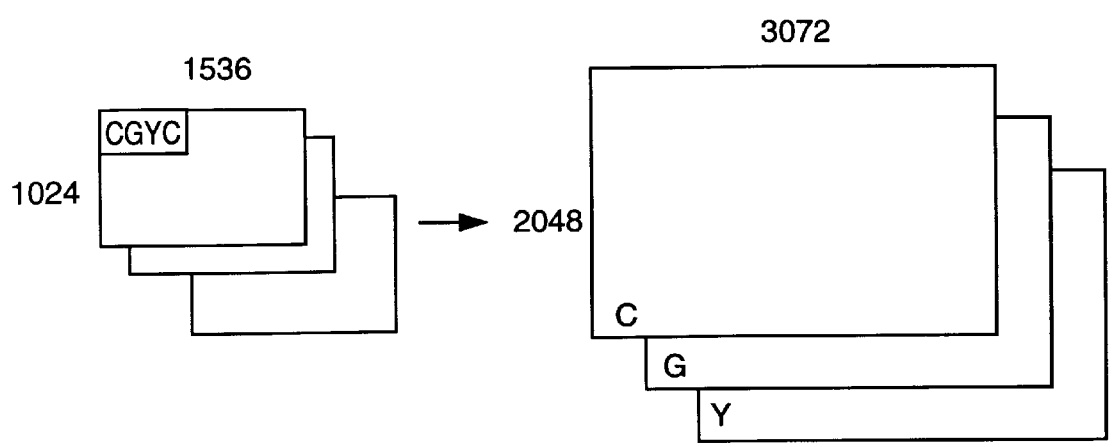
FIGS. 4A and 4B are explanatory views showing signal processing in the mode 1.
Figure 4B:
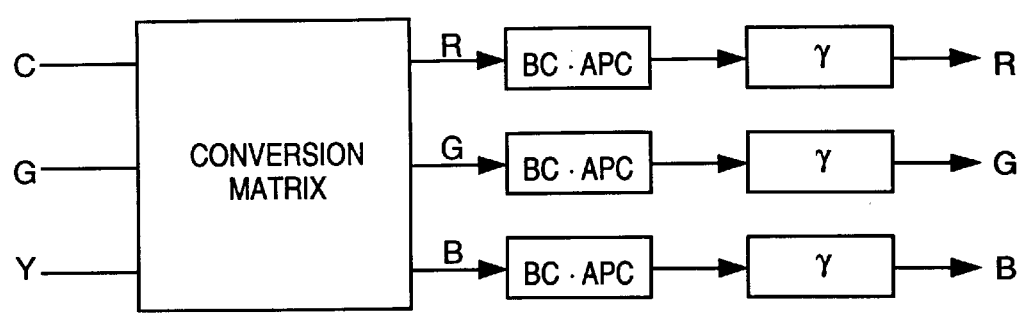

Flow of the obtained image data is shown in FIGS. 4A and 4B.

The data of twelve images each obtained by reading the CCD 3 having 1536×1024 pixels is rearranged so as to form three images consisting of 3072×2018 pixels (FIG. 4A). Thereafter, the rearranged data is applied with a matrix operation, thereby transformed into R, G and B data. The matrix operation is as follow.

$$\begin{pmatrix} R \\ G \\ B \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} C \\ G \\ Y \end{pmatrix}$$

Thereafter, processes, such as base clipping (BC), aperture correction (APC) and γ correction, are applied to the R, G and B data, and 8-bit R, G and B data is generated (FIG. 4B).

Note, in the mode 1, neither the LPF set 1 (2-1) nor the LPF set 2 (2-2) is inserted into the light path.

Mode 2

Figure 5A:
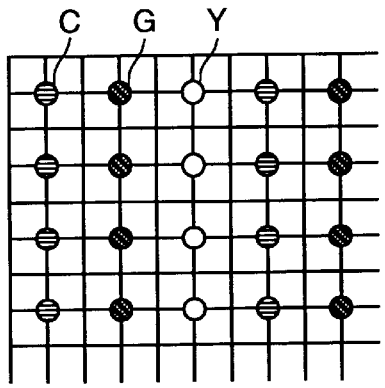
FIGS. 5A and 5B are explanatory views showing image sensing point arrays in mode 2.
Figure 5B:
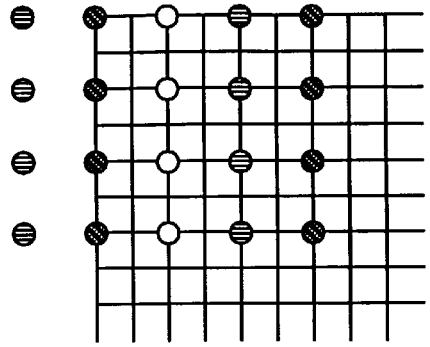

Mode 2 will be explained below. FIGS. 5A and 5B are explanatory views showing image sensing point arrays in the mode 2.

First, the optical LPF set 1 is inserted in the light path. Then, the first image is sensed in the image sensing point array shown in FIG. 5A (reference image sensing point array). Thereafter, the image sensing point array is shifted by 1.5 pitches in the horizontal direction and by a half pitch in the vertical direction, then the second image is sensed in the image sensing point array shown in FIG. 5B.

Figure 6:
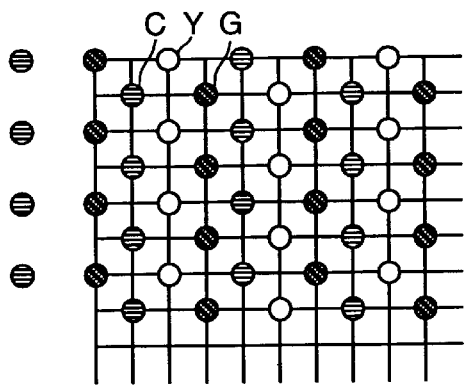
FIG. 6 is an explanatory views showing a combined image sensing point array in the mode 2.

When the reference image sensing point array shown in FIG. 5A and the image sensing point array, shown in FIG. 5B, in which the second image is sensed are combined, the resulted image sensing points appear as an array shown in FIG. 6. Accordingly, the obtained data is equivalent to data obtained by using a single CCD having about 3,000,000 pixels in a single image sensing process. It should be noted that the combined image sensing points are not at intersections of cross stripes in the right direction, but at intersections of cross stripes tilted by 45 degrees according to the first embodiment.

Figure 7A:
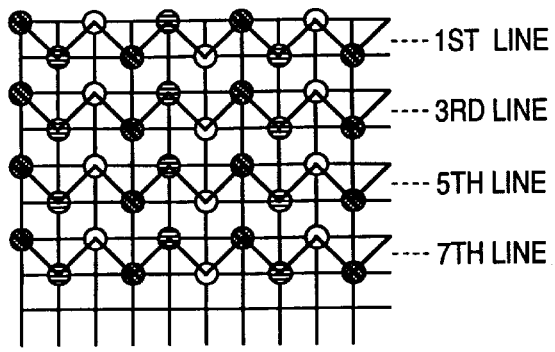
FIGS. 7A and 7B are explanatory views showing generation of luminance signals in the mode 2.
Figure 7B:
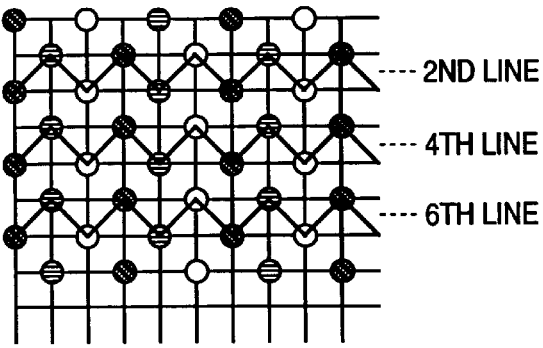

Next, signal processing in the mode 2 will be described. FIGS. 7A and 7B are explanatory views for explaining generation of luminance signals in the mode 2. As seen in FIGS. 7A and 7B, by taking data when switching alternatively between two adjacent horizontal lines, luminance signals are generated. More specifically, the data for the odd-number lines (FIG. 7A) which forms half of a final combined image and the data for the even-number lines (FIG. 7B) which forms the other half of the combined image can be obtained by alternatively reading data in two adjacent horizontal lines of image sensing point array, as shown in FIG. 6, in different combinations. By reading the data obtained in the image sensing point array in a way as described above, image data equivalent to image data obtained by using a single image sensor having about 6,000,000 pixels in one image sensing operation can be obtained.

Then, the luminance signals of the even-number line data and of the odd-number line data obtained as described above are applied with base clipping, aperture correction and γ correction, then outputted.

Figure 8:
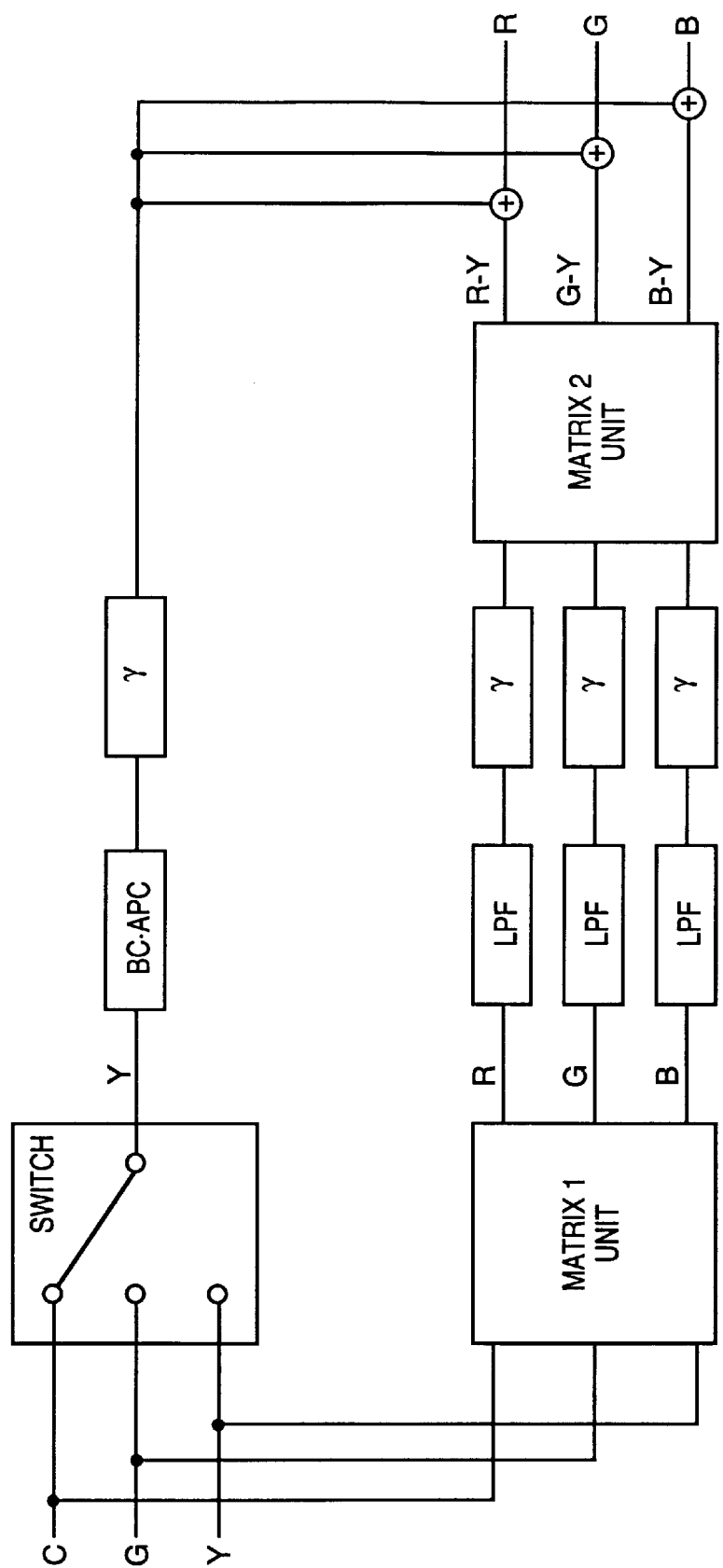
FIG. 8 is a block diagram illustrating a configuration of a signal processing circuit used in the mode 2.

As for color signals, the C, G and Y signals before being read by two adjacent lines are separately read out, converted into R, G and B signals by a matrix 1 unit (same as in the mode 1), passes through LPFs and γ correction circuits, then enter a matrix 2 unit (shown in FIG. 8).

In the matrix 2 unit, the R, G and B signals are converted to color difference signals, R-Y, B-Y and B-Y. Thereafter, the generated color difference signals are added with luminance signals Y which are obtained as described above, thereby obtaining R, G and B signals.

<<Optical LPF set 1>>

Figure 9:
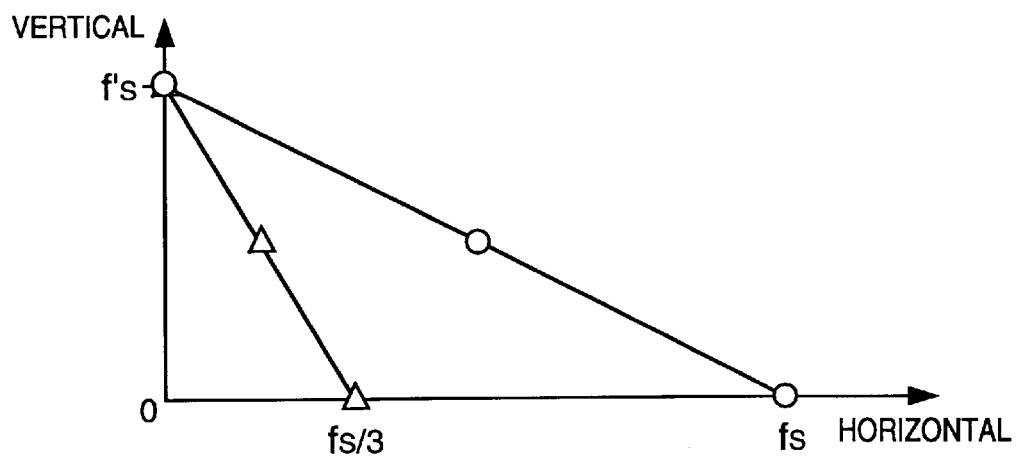
FIG. 9 is a graph showing points where color and luminance carrier signals are generated in a frequency space when an image of an object is sensed at positions of the image sensing point array shown in FIG. 6.
Figure 10:
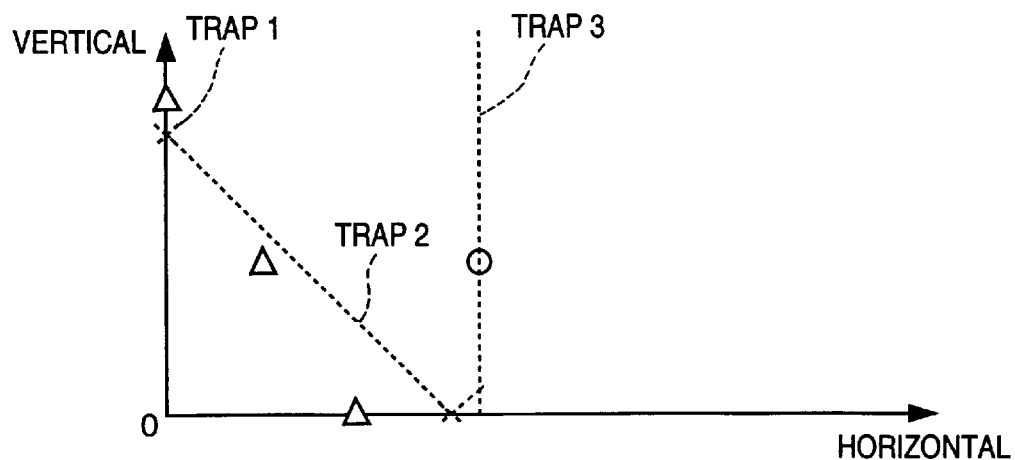
FIG. 10 is a graph representing traps of optical filters.

Next, an optical LPF set 1 will be described in accordance with the images sensed in the mode 2. FIG. 9 is a graph showing color carrier and luminance carrier generation points in a frequency space in an image sensed in the image sensing point array shown in FIG. 6 (mode 2). In FIG. 9, fs is the sampling frequency in the horizontal direction, and f's is the sampling frequency in the vertical direction. The optical LPF set 1 (2-1) for dealing with the carriers shown in FIG. 9 reduces the color carrier signals on oblique dashed lines labeled by traps 1 and 2 in FIG. 10 so as to make the response equal to 0, and reduces the luminance carrier signals on a vertical dashed line labeled by trap 3 in FIG. 10 so as to make the response be 0. The optical LPF set 1 having the aforesaid characteristics can be made of three quartz plates.

Mode 3

Figure 11A:
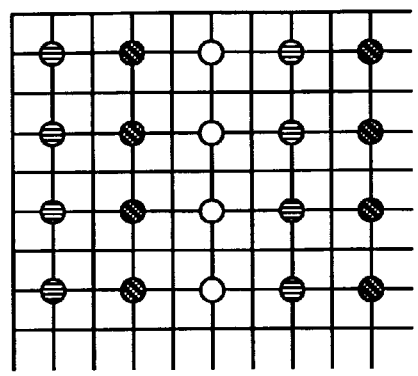
FIGS. 11A to 11C are explanatory views showing image sensing point arrays in mode 3.
Figure 11B:
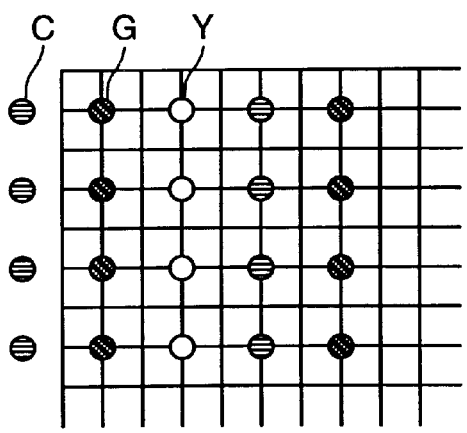
Figure 11C:
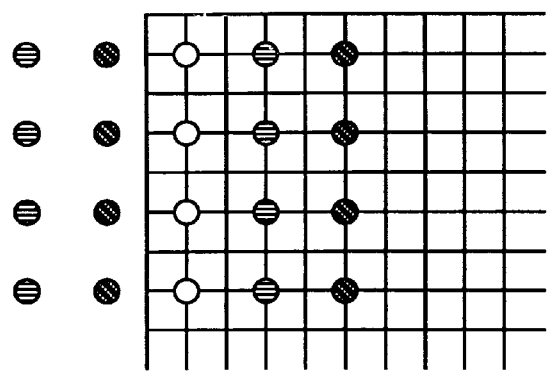

Next, mode 3 will be described. FIGS. 11A to 11C are explanatory views showing image sensing point arrays in the mode 3.

In the mode 3, neither the optical LPF set 1 nor 2 is set in the light path. First, the first image is sensed (FIG. 11A). Then, the CCD 3 is shifted by a pitch in the horizontal direction, then the second image is sensed (FIG. 11B). Thereafter, the CCD 3 is further shifted by a pitch in the horizontal direction, then the third image is sensed (FIG. 11C).

As a result, image data of images of three colors, C, G and Y, each sensed at image sensing points of a CCD having about 1,500,000 pixels are obtained. This equivalent to image data sensed by using three image sensors each having about 1,500,000 pixels in one image sensing operation. This is why the mode 3 is also called as "three normal resolution image sensor mode".

The obtained image data is rearranged to form three images of C, G and Y (FIG. 12). The processes applied to the rearranged signals are mostly the same as in the mode 1 explained with reference to FIG. 4B.

Mode 4

Mode 4 will be now described. FIGS. 13A and 13B are explanatory views showing image sensing point arrays in the mode 4.

In the mode 4, the optical LPF set 2 is inserted in the light path. Thereafter the first image is sensed (FIG. 13A). Next, the CCD 3 is shifted by 1.5 pitch in the horizontal direction and the second image is sensed (FIG. 13B).

FIG. 14 shows a combined image sensing point array when the two images obtained as above are combined. As seen in FIG. 14, the density of the image sensing points in the horizontal direction in mode 4 is double the density of the image sensing points of the CCD 3, and color carrier shifts to higher frequency.

Next, signal processing in mode 4 will be described. FIGS. 15A and 15B are explanatory views showing signal processing in the mode 4. The image data of the two sensed images are combined together to be data of an image composed of 3072×1024 pixels (FIG. 15A). Thereafter, the combined data is applied with signal processes and inputted into an anisotropic magnification circuit so as to generate R, G and B signals (FIG. 15B). The anisotropic magnification circuit can be a simple digital LPF or an adder for adding two adjacent pixels in horizontal lines.

<<Optical LPF set 2>>

Figure 16:
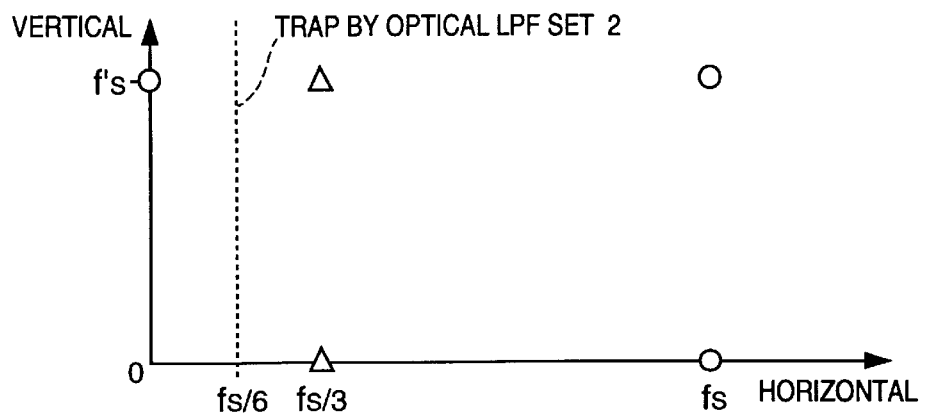
FIG. 16 is a graph showing points where color and luminance carrier signals are generated and trap of an optical filter set.

FIG. 16 is a graph showing points where color and luminance carrier signals are generated and trap of the optical filter set 2. when the optical LPF set 2 is used, carrier signals are trapped in a frequency which is much lower than an actual frequency (i.e., Nyquist frequency of color signals), thereby greatly reducing color moire.

Mode 5

Mode 5 will be explained. This mode is called the "single normal resolution image sensor mode 2".

Figure 17:
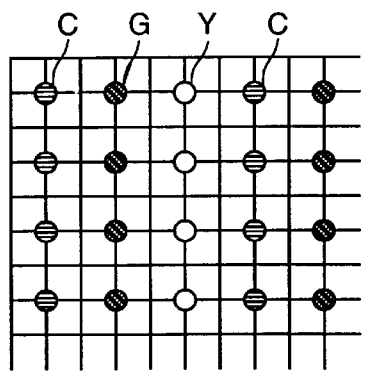
FIG. 17 is an explanatory view showing image sensing point array in mode 5.

After the optical LPF set 2 is inserted into the light path, data of an image is sensed. An image sensing point array in the mode 5 is shown in FIG. 17.

Figure 18:
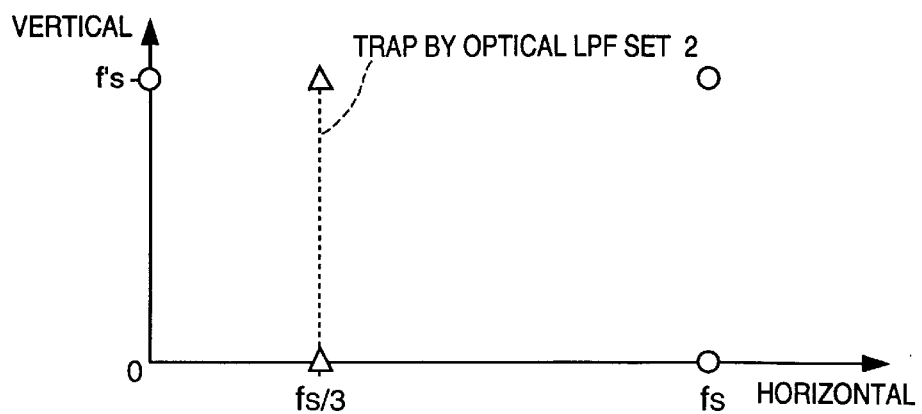
FIG. 18 is a graph showing points where color and luminance carrier signals are generated and trap of an optical filter set.

Signal processes in the mode 5 is similarly to those explained in the mode 2 with reference to FIG. 8. FIG. 18 is a graph showing points where color and luminance carrier signals are generated and trap of the optical filter set 2. An optical LPF which traps signals at the trap frequency shown in FIG. 18 can be realized with a quartz plate.

As described above, with the image sensing apparatus of the first embodiment of the present invention, appropriate signal processes are applied to image data in accordance with a selected image sensing mode. Relationship between the image sensing modes, the optical LPF used, and the number of sensed images is shown in the following table.

|  | Optical LPF | Number of Images |
| --- | --- | --- |
| Mode 1 | None | 12 |
| Mode 2 | Set 1 | 2 |
| Mode 3 | None | 3 |
| Mode 4 | Set 2 | 2 |
| Mode 5 | Set 2 | 1 |

As described above, it is possible for a user to select a mode in accordance with an object to be sensed.

<Data Transfer Process to Storage Medium>

Next, relationship between storage media and compression ratios will be described.

If the speed of each write and read operation to/from a storage medium (e.g., flash memory) is slow, it takes a long time to write and read image data to/from the storage medium. This implies that it requires a longer time for sensing an image. Therefore, where a storage medium to/from which speed of writing and reading data is slow, the speed is determined in the initial self-check process, and the compression ratio applied to image data to be stored in the storage medium is changed (more specifically, when the speed is slow, then the image data is more compressed), thereby compensating the total time of image sensing operations for obtaining a final combined image.

For example, assuming that image sensing operations are performed in the same image sensing mode, e.g., in the mode 1, and the speed of writing to the hard disk drive 8-1 and the speed of writing to the flash memory 8-2 are, HDD: 3 MB/s Flash memory: 1.5 MB/s.

Since data of twelve images are to be stored in the mode 1, if the compression ratio for writing to the HDD 8-1 is 2:1 and the data of one image is about 1.5 MB, then the total time required to writing all of the data to the HDD 8-1 is, 1.5 MB×12 images×½÷3 MB/s=3 s.

If the same compression ratio is used to write all the data to the flash memory 8-2, the time required is, 1.5 MB×12 images×½÷1.5 MB/s=6 s.

As apparent from above, two times longer is required to store all the data in the latter case. Therefore, in the first embodiment, since it is known that the speed of the flash memory 8-2 is slower by the self-check process, in a case where the flash memory 8-2 is used, the compression ratio is changed to 4:1 accordingly. As a result, the time required becomes, 1.5 MB×12 images×¼÷1.5 MB/s=3 s.

Thus, it takes the same time to store the twelve images as that in the case where the HDD is used.

Images are somewhat deteriorated, however, it is advantageous since the time required for image sensing operations to obtain a combined image of high resolution is shortened. Note, where a storage medium to/from which speed of writing and reading is very slow is used, it is possible to limit the compression ratio so as to prevent too much deterioration of the sensed images. In which case, however, there is a problem in which the time for completing image sensing operations becomes longer.

As described above, upon storing image data, whose amount differs depending upon each mode, in a storage medium whose operation speed differs depending upon the kind of the storage medium, it is possible to stabilize the performance of the image sensing apparatus by changing compression ratios.

<White Balance>

Next, white balance process in the data compression process will be described. In the first embodiment, unprocessed image data from the CCD 3 of 10-bit depth is converted into 8-bit signals by using a table stored in the DSP 11 with γ of 0.45. It is possible to perform white balance process before transforming the image data of 10-bit depth.

More specifically, coefficients to be used in the white balance process are adjusted on the basis of the values of C, G and Y data at a point which is most likely "white" in an image so that the values of the C, G and Y data at the white point multiplied by the adjusted coefficients consequently have the same value. For example, if the values of the C, G and Y data at a white point in an image read,

C=200, G=250, Y=100, then, the values of C and Y data of all the pixel are transformed in accordance with the following equations,

C'=1.25×C,

Y'=2.5×Y

G'=G

Accordingly, aliasing noises are especially reduced when sensing a non-chromatic object, and the deterioration of image becomes not very noticeable when data compression in the JPEG standard method is performed. The white balance process as described above is to be performed by the DSP 11 during compressing image data.

[First Modification of the First Embodiment]

Next, the first modification of the first embodiment will be explained.

In the first embodiment, the optical LPF set 1 is prepared exclusively for the mode 2, and a combined image of high resolution is obtained from two sensed images in the mode 2. However, it costs considerably to prepare the optical LPF set 1 which is used only in the mode 2.

In order to omit the optical LPF set 1, it is possible to sense an image of high precision with two images sensed without a LPF set for obtaining luminance signals and an image sensed with the optical LPF set 2 for obtaining color signals. The two images for obtaining luminance signals are sensed in the same manner as in the mode 2 but without the optical LPF set 1. Then, only the luminance signals are generated from these two images. Next, an image is sensed in the same manner as in the mode 5. Only the color signals are used out of the data of the image, and added with the luminance signals obtained from the two images. It should be noted that the color signals in this case have to be interpolated and expanded.

According to the first modification of the first embodiment, the number of images to be sensed increases by one compared to that of mode 2, however, it is possible to reduce the manufacturing cost.

[Other Modification of the First Embodiment]

It is possible to omit the optical LPF set 2. In this case, however, color carriers can not be reduced, thus moiré remains. However, it is possible to reduce the manufacturing cost.

Further, the use of the LPF sets in the first embodiment is an example, and any configuration may be possible as far as it can trap the color carriers and the luminance carriers. Further, as for the material of the optical LPF sets, it is not limited to quartz plates, but can be other optical materials.

Furthermore, when taking two images for obtaining luminance signals and one image for obtaining color signals as described in the first modification of the first embodiment, it is advantageous to take the images for obtaining luminance signals, first, then to take the image for obtaining color signals. This is because insertion/extraction of an optical LPF set produce vibration somewhat, and by taking the images for luminance signals which contribute to improve resolution, the influence of vibration can be reduced.

Furthermore, not all of the edges of an image can expressed in high resolution by sensing the image by using pixel shifting technique. For solving this problem, data corresponding to those edges which are not expressed in high resolution is generated by interpolating the first sensed image to compensate missing data, thereby avoiding the combined image from being unnatural.

Further, the CCD is moved by using a piezoelectric element or the like in the first embodiment, however, it is also possible to shift the light path of images by using an optical material, such as a wedge-shaped glass plate.

Further, the color filter is composed of color filter chips of complementary colors in the first embodiment, however, it is also possible to compose it with color filter chips of primary colors.

According to the first embodiment and its modifications as described above, since an image sensing mode can be manually selected in accordance with characteristics of an object to be sensed, it is possible to obtain a combined image of high resolution effectively with the smaller number of images as well as to realize high speed image sensing operation depending upon the speed of writing and reading to/from a storage medium.

[Second Embodiment]

In a second embodiment, focusing on an object, measurement of light exposure, and white balance control of an image sensing apparatus adopting pixel shifting technique will be explained.

Figure 19:
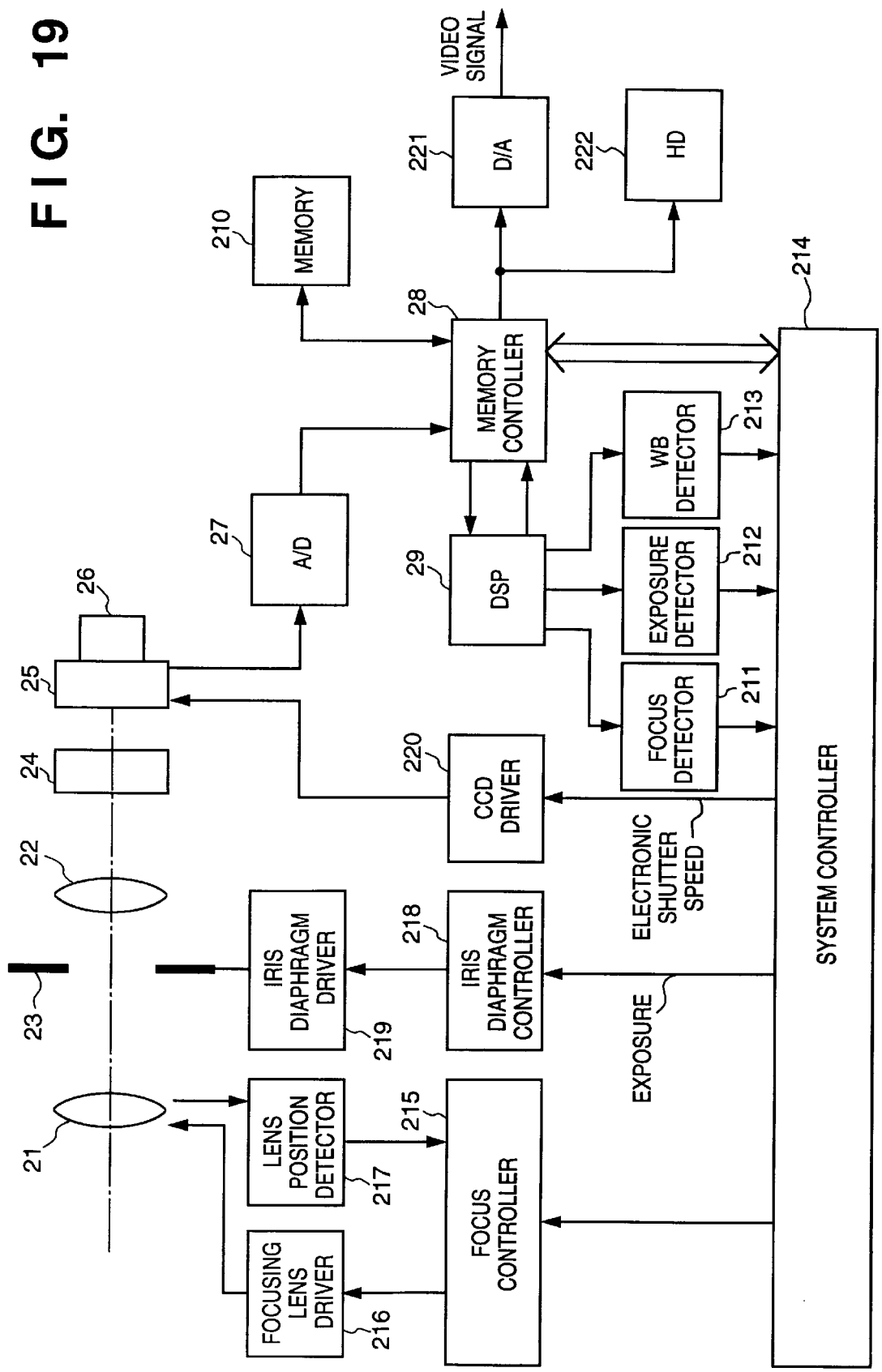
FIG. 19 is a block diagram illustrating a configuration of an image sensing apparatus according to a second embodiment of the present invention.

FIG. 19 is a block diagram illustrating a configuration of an image sensing apparatus according to the second embodiment of the present invention.

In FIG. 19, reference numerals 21 and 22 denote object lenses, and specifically, reference numeral 21 denotes a focusing lens system and reference numeral 22 denotes other object lenses; 23, an iris diaphragm; 24, an optical LPF; 25, a solid-state image sensing device, such as a CCD; 26, a pixel shifting unit; 27, an A/D converter; 28, a memory controller; 29, a digital signal processor (DSP); 210, a memory; 211, a focus detector; 212, exposure detector; 213, a white balance (WB) detector; 214, a system controller; 215, a focus controller; 216, a focusing lens driver; 217, a lens position detector; 218, an iris diaphragm controller; 219, an iris diaphragm driver; 220, a CCD driver; 221, a D/A converter; and 222, a hard disk.

An operation of the image sensing apparatus having the aforesaid configuration will be described next. Note, in the following explanation, exposure control includes control of incoming external light, such as control of iris diaphragm, shutter speed, and stroboscopic operation.

The quantity of light of luminous flux which passed through the focusing lens system 21 for controlling focus is controlled by the iris diaphragm 23, further passes through the lens 22 and the optical LPF 24 which is made of quartz, then forms an image on the solid-state image sensing device 25. The optical LPF 24 has spatial frequency characteristics to make the response be 0 at Nyquist frequency of a combined image which is finally obtained by using pixel shifting technique (i.e., ½ of the Nyquist frequency of the solid-state image sensing device 25) It acts so as to reduce aliasing noises.

The solid-state image sensing device 25 shifts on a plane which is perpendicular to the optical axis by the pixel shifting unit 26. On the solid-state image sensing device 25, a color filter array composed of color filter chips of complementary colors, Cy, Ye, Mg and G, are provided as shown in FIGS. 20A to 20D.

Now, it is assumed that the solid-state image sensing device 25 have square pixels having a pitch p. The pixel shifting unit 26 can shift the solid-state image sensing device 25 in the horizontal and vertical directions as indicated by arrows in FIG. 20A by using a piezoelectric element. After sensing an image 1 at the position shown in FIG. 20B, the pixel shifting unit 26 shifts the solid-state image sensing device 25 in the horizontal direction by p/2 and an image 2 is sensed at the position shown in FIG. 20C. The pixel shifting unit 26 further shifts in the vertical direction by p/2 and an image 3 is sensed at the position shown in FIG. 20D, finally, shifts in the horizontal direction (the opposite direction to that the solid-state image sensing device 25 is shifted for sensing the image 2) by p/2 and an image 4 is sensed at the position shown in FIG. 20E. With these four images 1 to 4, it is possible to obtain image data, as shown in FIG. 21, which corresponds to sensing an image at p/2 pixel intervals (with the same pixel aperture as of the solid-state image sensing device 25). Accordingly, it is possible to obtain a combined image of higher resolution than an image sensed by the solid-state image sensing device 25 in a single image sensing operation.

As for an operational sequence, in practice, in the image sensing operation for the first image 1, the focusing operation on the object, measurement of light exposure are performed and white balance is controlled. Image signals obtained from the solid-state image sensing device 25 are converted into digital signals by the A/D converter 27, passes through the memory controller 28, then transmitted to the DSP 29.

The DSP 29 generates luminance signals of an area which is assigned for focusing, then the generated luminance data is transmitted to the focus detector 211. The focus detector 211 is composed of a band-pass filter (BPF) 211a and an integrator 211b as shown in FIG. 22. The BPF 211a passes the middle to high frequency components of the inputted luminance signals, and the integrator 211b integrates the values of these signals. The middle to high frequency components corresponds to contrast of the sensed object, thus the difference in contrast, namely the integrated value of the middle to high frequency component values, can be considered as a focus evaluation value. This value has characteristics expressed by a concave-down shaped graph as shown in FIG. 23, in which the maximum value corresponds to the focusing state, and as the value decreases, it shows that an image is more defocused.

Accordingly, the focus evaluation value obtained by the focus detector is transmitted to the system controller 214, and the system controller 214 controls the focusing lens driver 216, through the focus controller 215, to drive the focusing lens system 21 so as to move in the direction in which the focus evaluation value increases. The lens position detector 217 is for detecting the position of the focusing lens system 21, and the output from the lens position detector 217 is fed back to the focus controller 215. The aforesaid operation is repeated, and when the focus evaluation value outputted from the focus detector 211 reaches the maximum, then the focusing operation is completed.

Further, the exposure detector 212 detects the current light exposure on the basis of the luminance signals obtained from the area which is set in advance for exposure measurement, then sends the detected information on exposure to the system controller 214. Then, electrical shutter speed and exposure value of the iris diaphragm are set so that the proper exposure can be achieved. Then the CCD driver 220 drives the solid-state image sensing device 25 at desired shutter speed, and the iris diaphragm controller 218 and the iris diaphragm driver 219 controls the opening of the iris diaphragm 23 to adjust the quantity of incoming light.

Further, the WB detector 213 detects a white point in the image on the basis of the color signals obtained from the DSP 29, then coefficients, for taking white balance, which color signals are multiplied by are transmitted to the DSP 29 through the system controller 214. These coefficients are used as parameters upon combining sensed images.

As described above, after focusing on the object, measuring light exposure and controlling white balance, an image is focused, and the image 1 is sensed under the proper exposure conditions. Thereafter, the image 1 is temporarily stored in the memory 210 with the coefficients to be used for the white balance correction.

Next, the pixel shifting unit 26 shifts the solid-state image sensing device 25 in the horizontal direction by p/2, then the image 2 is sensed. Upon sensing the image 2, the focusing on the object, measurement of light exposure, and white balance control are not performed, and the image 2 is sensed under the same conditions as for sensing the image 1. The image 2 is stored in the memory 210.

Figures 20A, 20B, 20C, 20D, 20E:
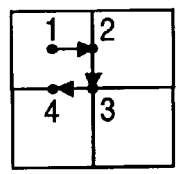

The same image sensing conditions are kept upon sensing the images 3 and 4, and the focusing on the object, measurement of light exposure, and white balance control are not performed. Similarly to sensing the image 2, the solid-state image sensing device 25 is shifted by p/2 in the vertical direction as shown in FIG. 20C and senses an image, then the image 3 is stored in the memory 210. Next, the solid-state image sensing device 25 is further shifted by p/2 in the horizontal direction and senses an image, then the image 4 is stored in the memory 210.

With the images 1, 2, 3 and 4, and the coefficients for white balance correction obtained while processing the image 1, the DSP 29 generates a combined image having twice higher resolution both in the horizontal and vertical directions than the resolution of the pixels of the solid-state image sensing device 25. This combined image is outputted in the form of analog video signals which are converted by the D/A converter 221, as well as stored in the hard disk (HD) 222 as digital data.

As described above, the image sensing conditions based on the focusing on the object, measurement of light exposure, and white balance correction performed during sensing the first images are fixed, and the second and later images are sensed under the same image sensing conditions, thereby the plurality of images to be combined for generating a single combined image are sensed under the same image sensing conditions. Therefore, it makes it easier to combine the plurality of images. Furthermore, exhaustion of a battery becomes slow.

According to the second embodiment as described above, in a case of sensing a plurality of images by changing the relative positions between an image sensing device and an object and generating a single combined image of high resolution from the plurality of images, it becomes unnecessary to focus on the object, measure light exposure and control white balance each time when sensing the second or later images by fixing the image sensing conditions based on the focusing on the object and measurement of light exposure, and white balance control performed during sensing the first image and applying the fixed conditions to sense the second or later images. Accordingly, in a case where the image sensing conditions do not change much, such as a case of sensing a still life, the plurality of sensed images include less unevenness. Further, it becomes unnecessary to repeatedly focus on the object and measure light exposure and control white balance after they are measured once, thereby the time for image sensing operation is shortened as well as exhaustion of a battery becomes slower.

In the second embodiment, the solid-state image sensing device 25 is shifted in the vertical and horizontal directions by p/2 to sense four images to generate a single combined image of high resolution. However, the pixel shifting pattern and the number of the images to be sensed are not limited as above, and any pixel shifting patterns can be applied as far as a plurality of images are sensed and these sensed images can be combined into a single image. For example, the pixel shifting patterns explained in the mode 1 to the mode 4 in the first embodiment can be applied to the second embodiment.

[Third Embodiment]

In the third embodiment, an apparatus capable of sensing a still image during sensing a moving image will be explained. In the third embodiment, a variable apical angle prism is used for shifting image formation position.

Figure 24:
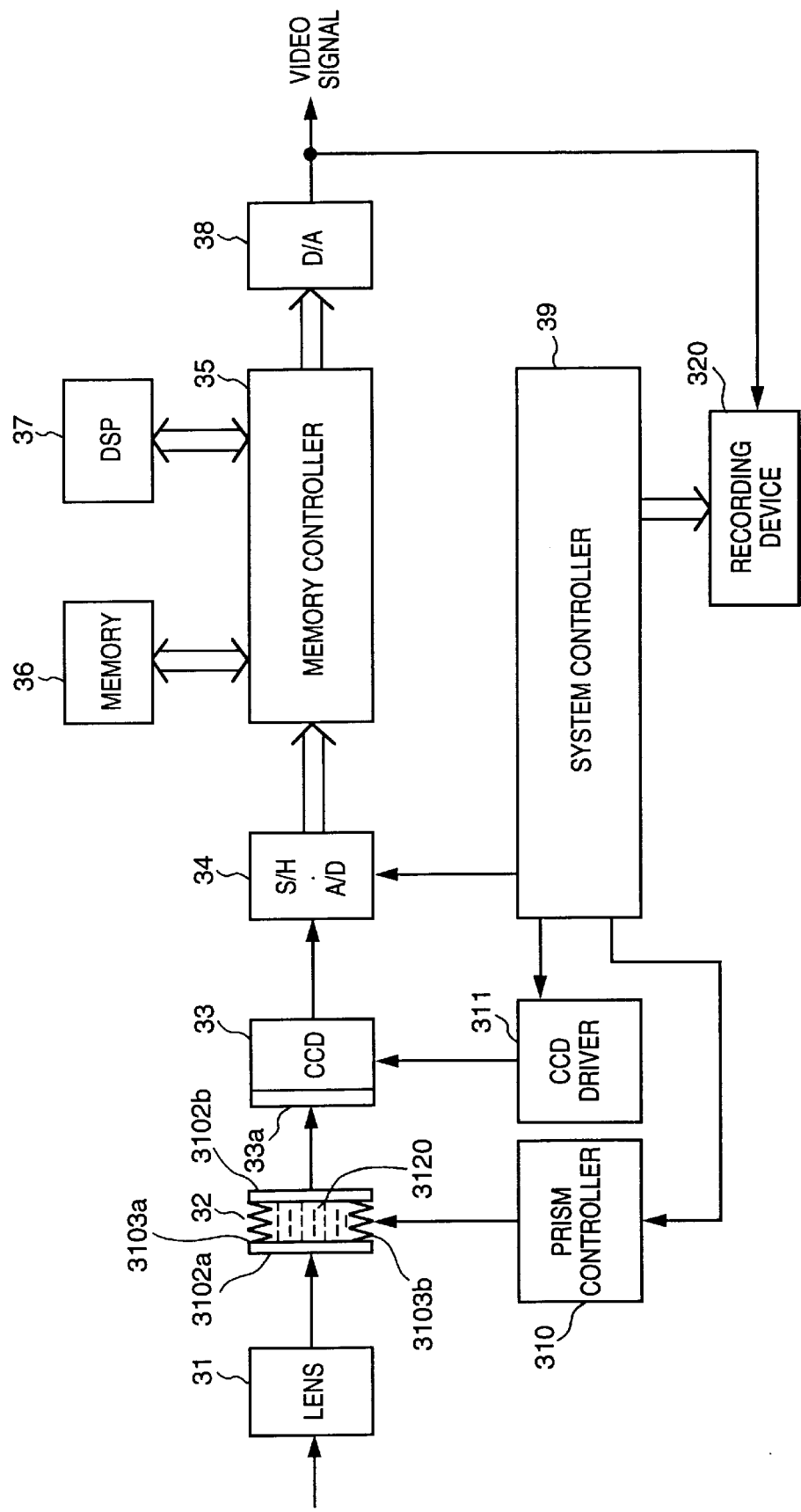
FIG. 24 is a block diagram illustrating a configuration of an image sensing apparatus according to a third embodiment of the present invention.

FIG. 24 is a block diagram illustrating a configuration of the image sensing apparatus of single image sensor type according to the third embodiment of the present invention.

Referring to FIG. 24, an operation of the image sensing apparatus according to the third embodiment will be described. A traveling path of an image of an object which enters through a lens 31 is shifted by a variable apical angle prism 32. Thereafter, the image passes through a color filter 33a, the image of the object is formed on the surface of a CCD 33 which is as an image sensing device.

As shown in FIG. 24, the variable apical angle prism 32 is composed in such a manner that two transparent plates 3102a and 3102b are shielded with expandable and contractile members 3101a and 3103b, and the area inside of the shielded plates is filled with liquid 3120 of a high refractive index. By tilting the transparent plates 3102a and 3102b with respect to the optical axis, it is possible to shift the image formation position on the CCD 33. The variable apical angle prism 32 will be described later in detail with reference to FIG. 30.

The CCD 33 converts the formed image of the object into electrical signals, then the obtained electrical image signals are applied with sample and hold process, thereafter, converted into digital image signals by a sample and hold (S/H) and analog-digital (A/D) converter 34. A memory controller 35 takes the digital image signals and writes them in a memory 36, thereafter, reads out the digital image signals from the memory 36 and sends them to a digital signal processor (DSP) 37. The signals processed by the DSP 37 are transmitted to a D/A converter 38 via the memory controller 35 and converted into analog signals, and outputted as video signals of a predetermined form. Further, the signals processed by the DSP 37 or the video signals can be stored by a recording device 320.

The aforesaid operation can be performed under control of a system controller 39. Further, the system controller 39 controls pixel shifting by the variable apical angle prism 32 via a prism controller 310 as well as controls to drive the CCD 33 via a CCD driver 311.

FIG. 25 is an explanatory view showing an arrangement of color filter chips, composing a color filter 33a, provided on the surface of the CCD 33.

As shown in FIG. 25, G filter chips are arranged at every other pixels in every line in such a manner that no two consecutive pixels both in the horizontal and vertical directions are provided with G filter chips, and the remaining pixels are provided with either R or B filters. This arrangement shown in FIG. 25 is called Bayer arrangement.

Next, a method of processing signals when the color filter having aforesaid arrangement will be described.

First, a luminance signal Y1 in the first line is obtained by reading pixel values on the line by switching, $Y1 = G_{11}, R_{11}, G_{21}, R_{21}, G_{31} \ldots$ Similarly, luminance signal of each line can be obtained as following examples.

$Y2 = B_{12}, G_{12}, B_{22}, B_{22} \ldots$
$Y3 = G_{13}, R_{13}, G_{23}, R_{23} \ldots$ Next, low frequency color signals, $R_L$, $G_L$ and $B_L$ are generated. These signals are obtained by interpolation between pixel values by using a low-pass filter as described below.

$R_{L1} = R_{11}, (R_{11}+R_{21})/2, R_{21}, (R_{21}+R_{31})/2 \ldots$
$G_{L1} = G_{11}, (G_{11}+G_{21})/2, G_{21}, (G_{21}+G_{31})/2 \ldots$
$B_{L1} = B_{11}, (B_{11}+B_{21})/2, B_{21}, (B_{21}+B_{31})/2 \ldots$ Next, color difference signals, R-Y, B-Y are generated by using these low frequency color signals, $R_L$, $G_L$ and $B_L$.

Figure 26:
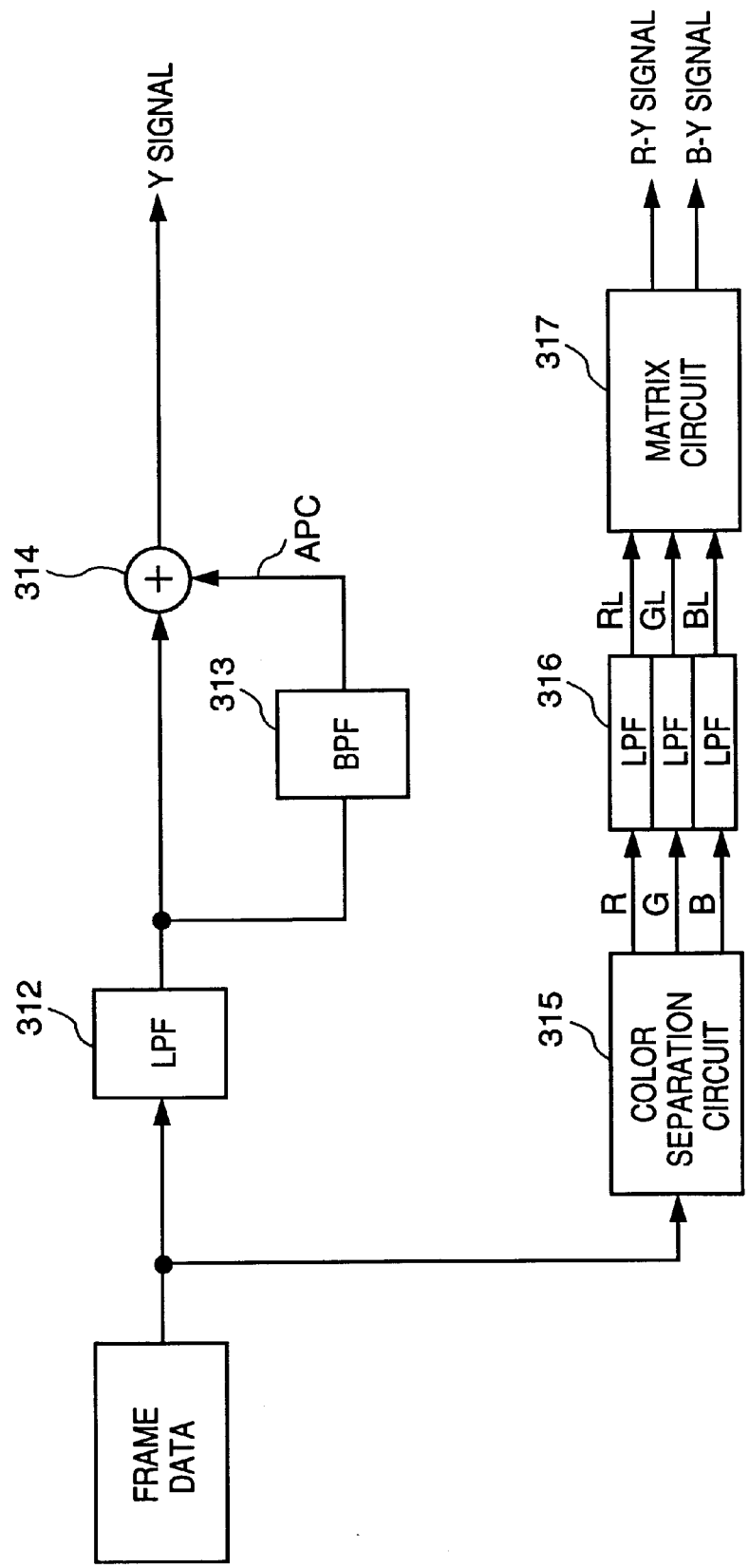
FIG. 26 is a block diagram illustrating a configuration of a unit for a moving image processing in a digital signal processor.

The above processes are performed by the DSP 37. FIG. 26 is a block diagram illustrating a configuration of a unit for a moving image processing in the DSP 37.

A frame data stored in the memory 36 passes through a LPF 312, then through a band-pass filter 313, thereby aperture correction signals APC are obtained. The APC signals are added to signals from the LPF 312 by an adder 314, and luminance signals Y are obtained.

Meanwhile, the frame data is also applied with color separation by a color separation circuit 315 to obtain R, G and B signals. These R, G and B signals pass through the LPFs 316, then the low frequency signals $R_L$, $G_L$ and $B_L$ are obtained. Further, these signals $R_L$, $G_L$ and $B_L$ are applied with a matrix operation by a matrix circuit 317, thereby the color difference signals R-Y and B-Y are generated.

Next, timing of reading pixel data from the CCD 33 and timing to control the variable apical angle prism 32 will be explained.

Figure 27:
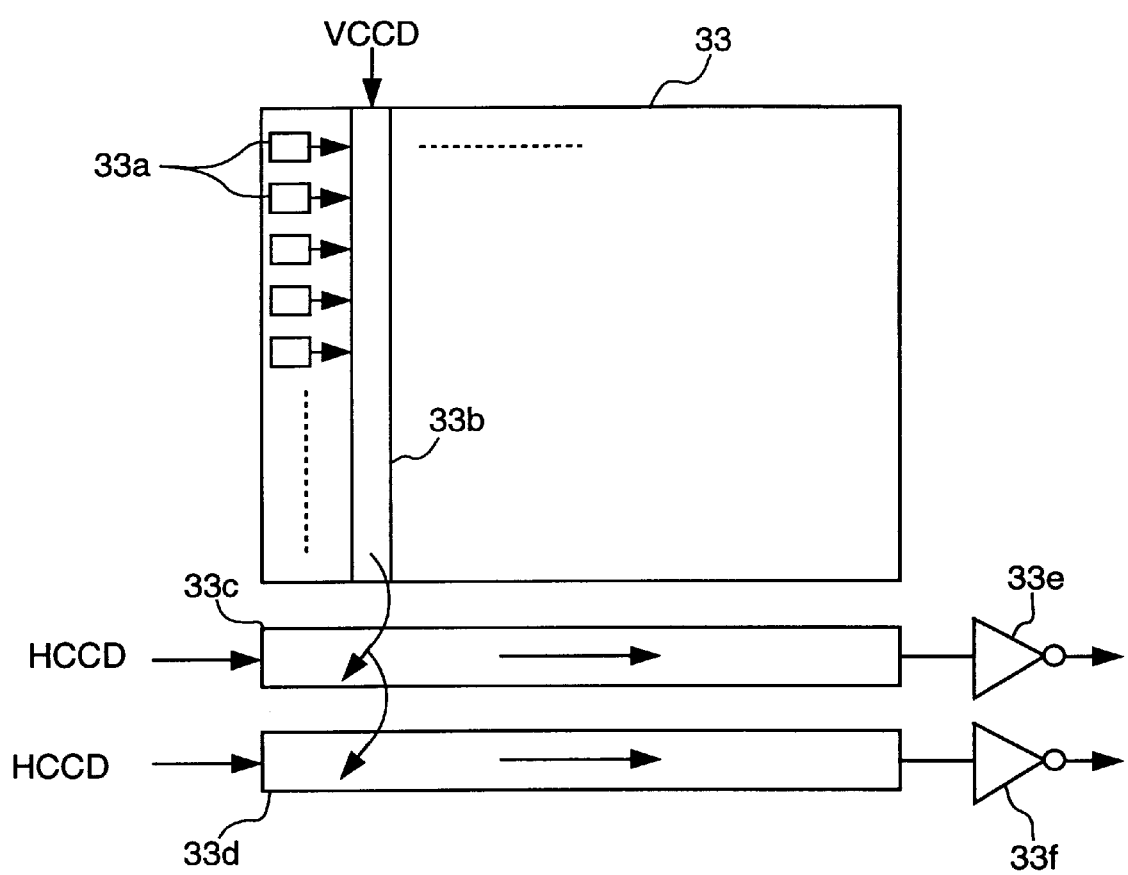
FIG. 27 shows a brief configuration of a CCD.

FIG. 27 shows a brief configuration of the CCD 33.

Referring to FIG. 27, electrical charge converted by each photodiode 33a is read out to a vertical register 33b, and transferred to two horizontal registers 33c and 33d by two lines in one horizontal blanking period in accordance with a vertical driving pulse VCCD. The transferred charge is outputted via output amplifiers 33e and 33f in one horizontal scanning period in accordance with horizontal driving pulses HCCD.

If it is assumed that the CCD 33 has 640 pixels in the horizontal direction and 480 pixels in the vertical direction, then (640×2)×240 pixels, namely all the pixels, can be read out in one field period. In a case where the obtained image data is outputted as a moving image, first and second lines, third and fourth lines, and so on, are added to generate image data of an ODD field, and second and third lines, fourth and fifth lines, and so on, are added to generate image data of an EVEN field, and outputted as a field image consisting of 240 lines in one field period.

FIG. 28A to FIG. 28E are timing charts showing timing of operation of the CCD 33 and the variable apical angle prism 32 when all the pixels are read out in one field period.

Figure 28:
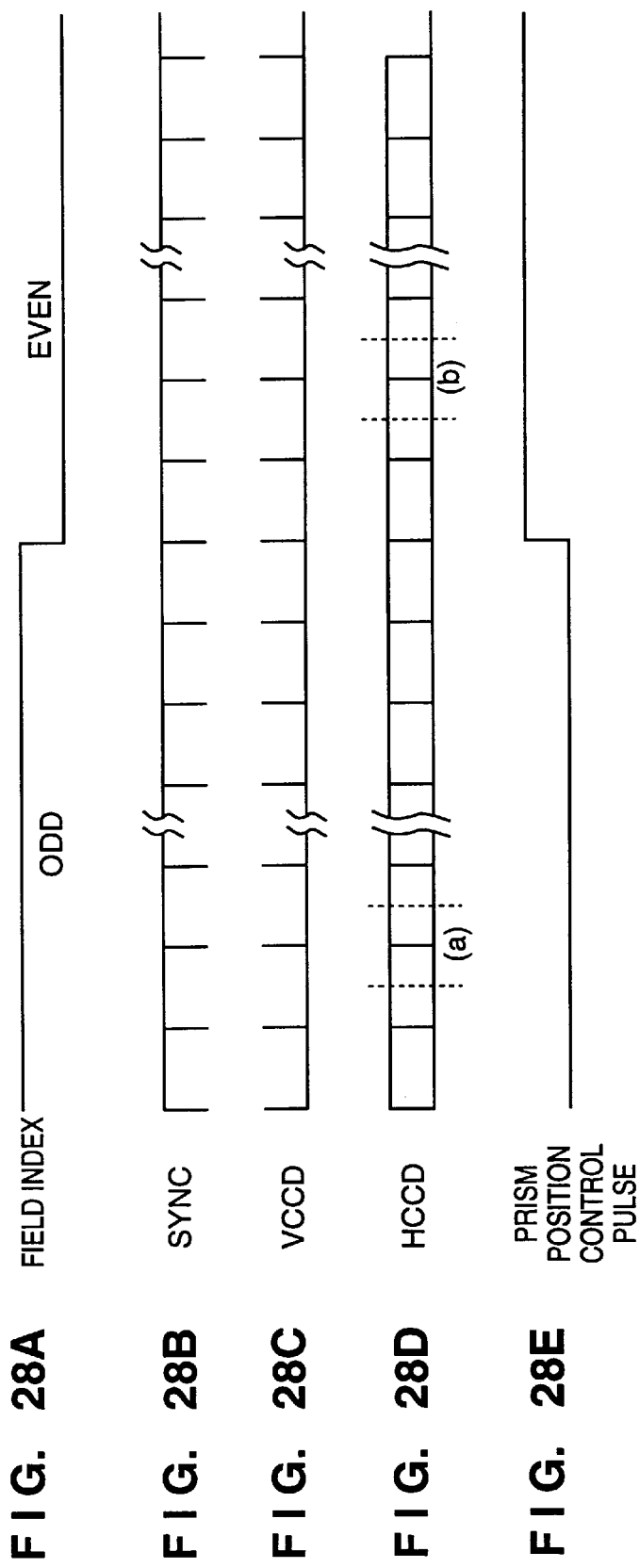
FIGS. 28A to 28E are timing charts showing operation of the image sensing apparatus according to the third embodiment.

FIG. 28A is a timing chart of a field index signal, and shows a period for reading out the ODD field and a period for reading out the EVEN field of a moving image. FIG. 28B is a timing chart of SYNC pulses and shows a horizontal synchronization signal. FIG. 28C is a timing chart of the vertical driving pulses VCCD, and FIG. 28D is a timing chart of the horizontal driving pulses HCCD. Further, FIG. 28E shows a prism position control pulse for controlling the position of the variable apical angle prism 32. This pulse is for setting the variable apical angle prism 32 in the different positions when reading image signals for the ODD field and when reading image signals for the EVEN field, to shift pixels.

Figure 29:
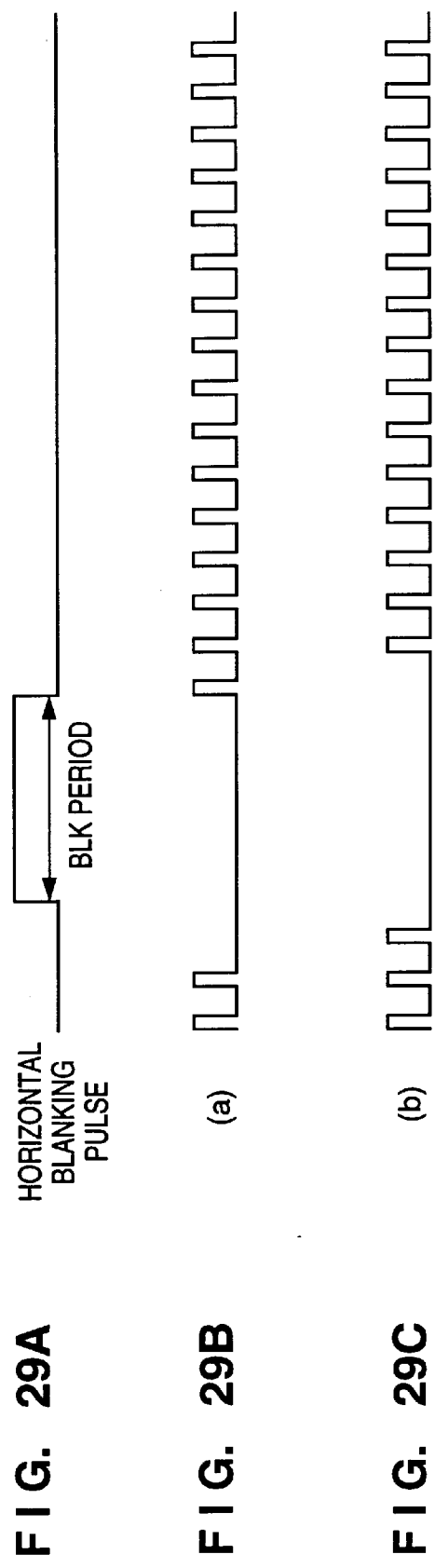
FIGS. 29A to 29C are timing charts showing enlarged portions of FIG. 28D.

FIG. 29B is an enlarged view of a part (a) of the timing chart, shown in the FIG. 28D, of the horizontal driving pulse HCCD when reading image signals for the ODD field, and FIG. 29C is an enlarged view of a part (b) of the timing chart, shown in FIG. 28D, when reading image signals for the EVEN field. The both FIGS. 29B and 29C are shown in relationship with a horizontal blanking (BLK) period.

More specifically, for reading image signals for the ODD field, it starts reading the horizontal registers 33c and 33d at normal scanning timing. Whereas, for the EVEN field, it starts reading them at timing which is one pixel behind.

Thus, in a case of outputting the obtained image data as a moving image, it is possible to compensate the shift of image formation positions on the surface of the CCD 33 by the variable apical angle prism 32 by controlling timing to read out image data from the CCD 33 depending upon whether reading for the ODD field or reading for the EVEN field. Note, the shifting amount, namely one pixel distance, corresponds to the shifted amount of the image of the object.

According to the aforesaid operation, in a case of sensing a continuous moving image with the CCD 33, if the pixel shifting is performed by each field, it is possible to prevent the shift of image formation position from affecting output of the continuous moving image while taking pixel-shifted image data from the CCD 33.

Figure 30:
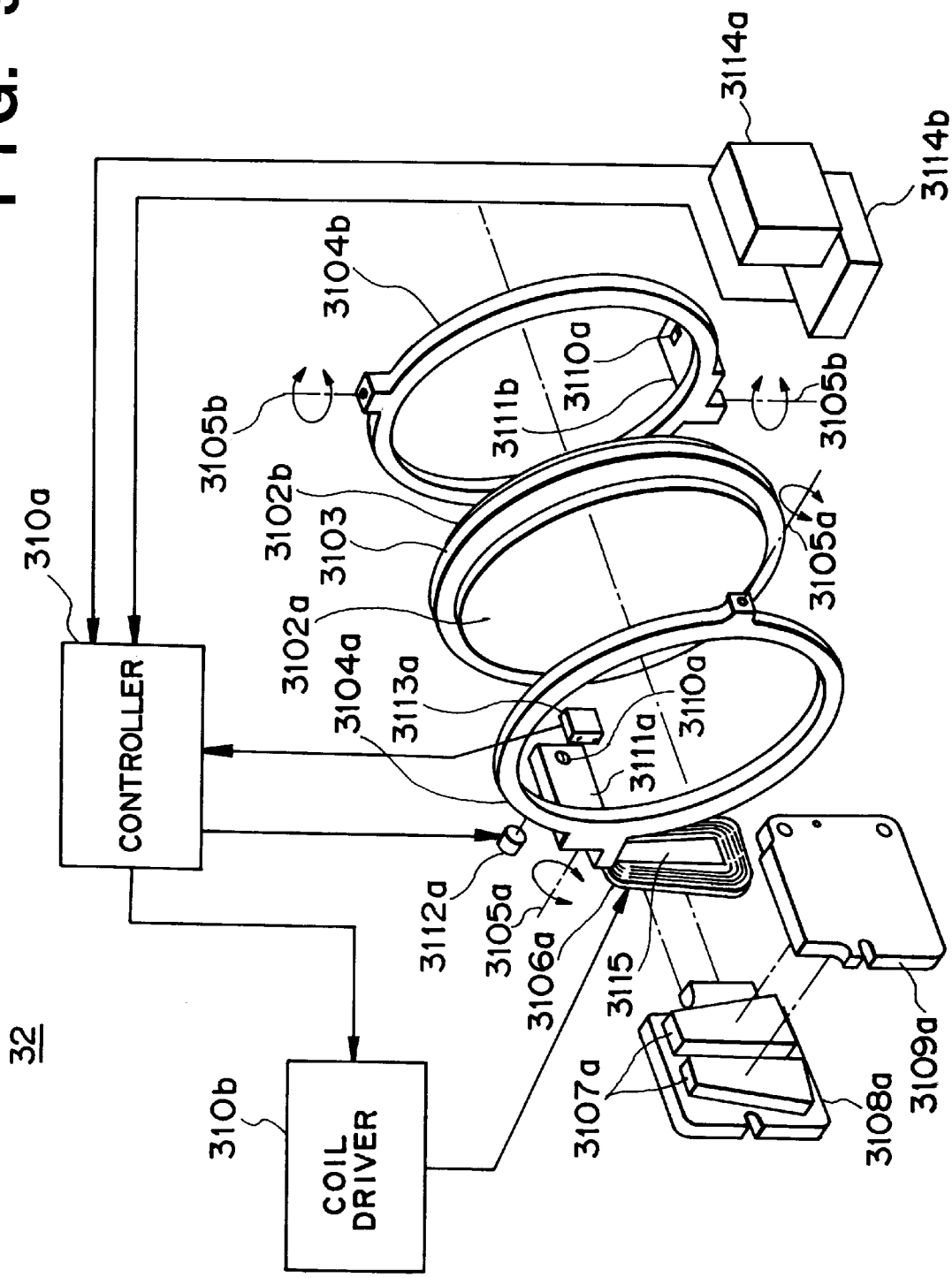
FIG. 30 is a decomposed perspective view of a variable apical angle prism.

FIG. 30 is a decomposed perspective view of the variable apical angle prism 32.

Referring to FIG. 30, reference numeral 3102a and 3102b are the two transparent plates facing to each other, shielded with a film 3103 which is used as the expandable and contractile members 3101a and 3103b. Then, the room shielded by the plates 3102a and 3102b and the film 3103 is filled with liquid 3120 (refer to FIG. 24) of a high refractive index. Reference numerals 3104a and 3104b denote holding members for holding the transparent plates 3102a and 3102b and are supported by a rotational axis 3105a (called "pitch axis", hereinafter) for tilting in the back and forth directions with respect to the optical axis and by a rotational axis 3105b (called "yaw axis", hereinafter) for rotating in the right and left directions with respect to the optical axis, respectively.

Reference numeral 3106a denotes a driving coil fixed at an end of the holding member 3104a, and an permanent magnets 3107a and yokes 3108a and 3109a are provided so as to put the driving coil 3106a in between, and making a closed magnet circuit. Reference numeral 3111a denotes an arm which is integrally configured with the holding member 3104a and has a hole 3110a. Reference numeral 3112a is a light emit element, such as IRED and reference numeral 3113a is a light receiving element, such as a PSD, which outputs different signal depending upon the receiving position of luminous flux. These two elements 3112a and 3113a are arranged facing each other through the hole 3110a. Thus, luminous flux emitted from the light emit element 3112a passes through the hole 3110a and incidents on the light receiving element 3113a.

Reference numeral 3114a and 3114b are vibration detectors attached to an holding member of the variable apical angle prism so as to detect the amounts of vibration in the back-and-forth rotational direction (pitch direction) and the right-and-left rotational direction (yaw direction) of the prism, respectively. Reference numeral 310a denotes a controller for controlling rotation of the transparent plate 3104a, and reference numeral 310b is a coil driver for driving the driving coil 3106a in accordance with driving signals from the controller 310a. Further, reference numeral 3115 denotes a point of action of the driving coil 3106a in a space.

A driving coil 3106b (not shown), a permanent magnet 3107b (not shown), yokes 3108b and 3109b (not shown), a hole 3110b, an arm 3111b, a light emit element 3112b (not shown), and a light receiving element 3113b (not shown) are also provided for the holding member 3104b which is supported by the yaw axis. These elements correspond to those referred by 3106a, 3107a, 3108a, 3109a, 3110a, 3111a, 3112a, 3113a, respectively, and operate in the likewise manner, thus the explanations of these elements are omitted.

According to the variable apical angle prism 32 configured as above, the controller 310a and the coil driver 310b control and drive the driving coils 3106a and 3106b (not shown), and tilt the transparent plate 3102a and rotate the transparent plate 3102b. Thereby, it is possible to shift the light path of the image of the object by one pixel in the horizontal direction and/or the vertical direction by each field.

Next, a method of obtaining a high resolution still image from a plurality of images sensed by field by using the aforesaid pixel shifting technique will be explained with reference to FIGS. 31A, 31B, 32A and 32B.

Figures 31A, 31B:
FIGS. 31A and 31B are explanatory views showing an arrangement of color filter chips upon sensing each field.

FIG. 31A shows a relative arrangement of the color filter by pixel on the surface of the CCD 33 when sensing the ODD field image. Further, FIG. 31B shows a relative arrangement of the color filter by pixel on the surface of the CCD 33 when sensing the EVEN field image. As seen from FIGS. 31A and 31B, the latter arrangement is shifted by one pixel in the horizontal direction with respect to the arrangement shown in FIG. 31A for sensing the ODD field image. Note, in FIGS. 31A and 31B, it looks as if the CCD 33 itself is shifted, however, the CCD 33 does not move in the third embodiment and it is the image formation position that shifted to the left in practice.

As seen in FIGS. 31A and 31B, image sensing points where contributed by G signals in FIG. 31A are contributed by R or B signals in FIG. 31B. Further, at image sensing points where contributed by R and B signals in FIG. 31A are contributed by G signals in FIG. 31B.

By combining and rearranging these data obtained with the filter arrangements shown in FIGS. 31A and 31B, the first image data as shown in FIG. 32A and the second image data as shown in FIG. 32B are obtained. As the first image data, G signals, which contribute to generation of luminance signals mostly, are obtained throughout the pixels. As the second image data, R and B signals are arranged in horizontal stripes. As described above, by combining two pixel-shifted images obtained for the ODD field and the EVEN field, two sets of image data, shown in FIGS. 32A and 32B, for high frequency signals are generated.

Figure 33:
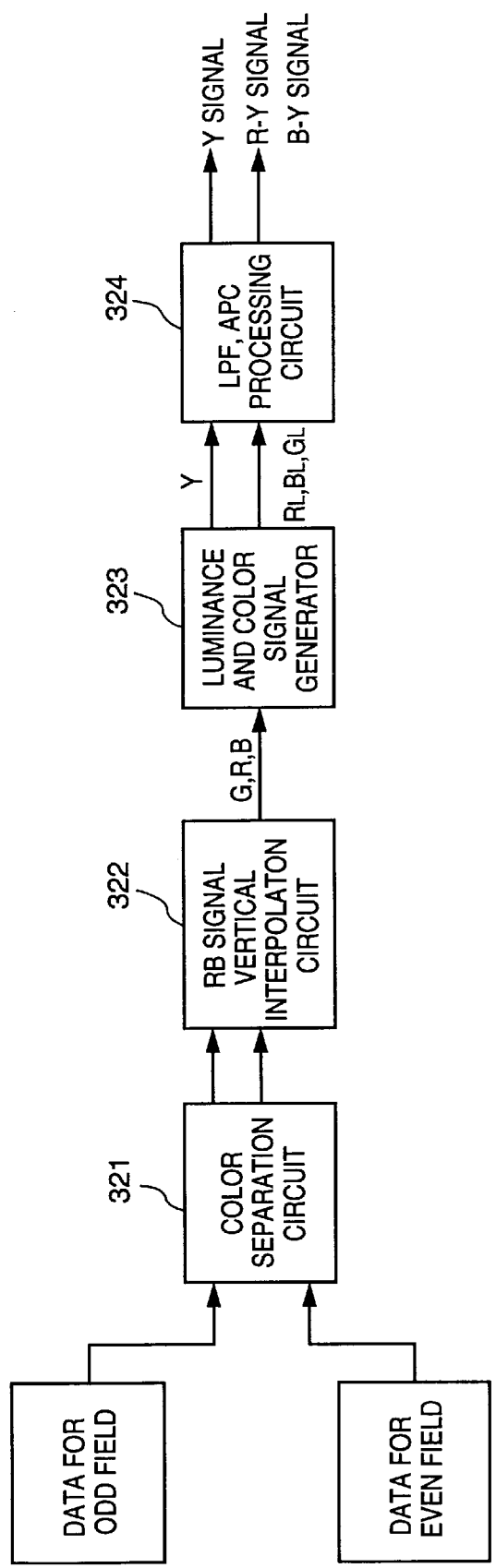
FIG. 33 is a block diagram illustrating a configuration of a still image processing unit.

A block diagram of a still image processing unit for processing these first and second data is shown in FIG. 33.

Referring to FIG. 33, the data for ODD field and the data for the EVEN field as shown in FIGS. 31A and 31B, respectively, are color-separated into the first image data and the second image data as shown in FIG. 32A and 32B by a color separation circuit 321. Regarding R and B signals, they are interpolated in the vertical direction by an RB signal vertical interpolation circuit 322, thereafter low frequency color signals, $R_L$, $G_L$ and $B_L$ are generated. Further, luminance signals Y are generated in accordance with the following equation, $$Y = 0.3R + 0.6G + 0.1B$$

Next, various kinds of outline compensation processing and LPF processing are performed by a LPF, APC processing circuit 324, thereby luminance signals in high frequency range and color difference signals, R-Y and B-Y are obtained.

Next, an optical LPF will be explained in accordance with image data obtained as above.

The characteristics of pixel arrangement when sensing image data in high frequency range are that the R and B signals are arranged in horizontal stripes. Therefore, frequency components which is higher than the frequency of the R and B stripes have to be deleted, or moire will occur.

Figures 34, 35:
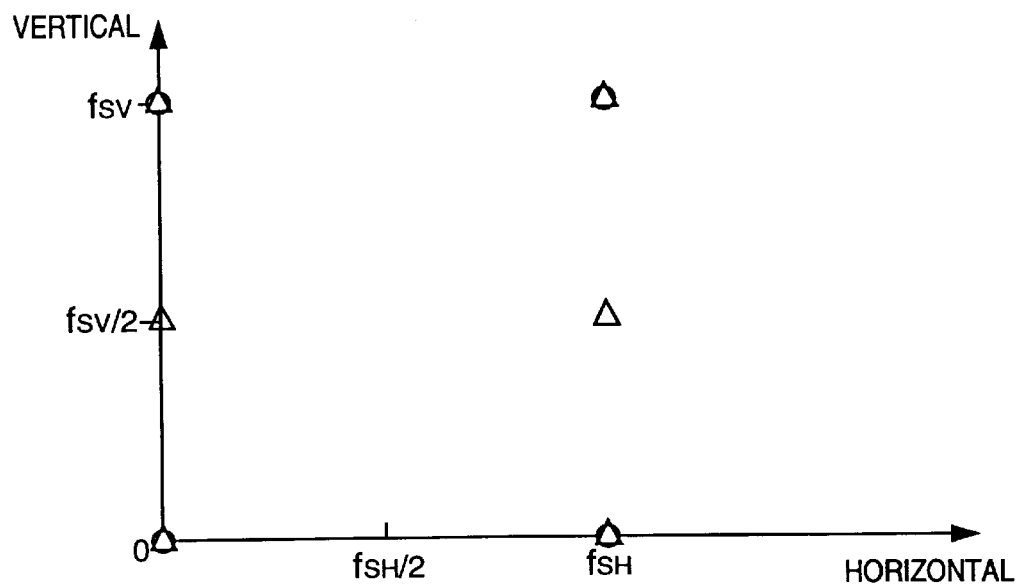
FIG. 34 is a graph showing points where sampling carrier signals are generated.
FIG. 35 is an explanatory view showing other arrangement of color filter chips.

In FIG. 34, $f_{SV}$ is a sampling frequency in the vertical direction, and $f_{SH}$ is a sampling frequency in the horizontal direction. As seen from FIG. 34, because of the repeated pattern of the horizontal stripes, carriers which occur at a point where vertical frequency=$f_{SV}/2$ and points where horizontal frequency=0 and $f_{SH}$ cause moiré. Therefore, an optical LPF which has a characteristic of trapping these frequencies has to be placed in front of the CCD 33.

By providing the optical LPF, frequency band is controlled in the vertical direction, however, the point, vertical frequency=$f_{SV}/2$, is often trapped for preventing flicker when sensing a moving image in practice, thus there is no substantial problem.

Next, switching between a moving image mode and a still image mode will be explained.

In the third embodiment, the image sensing apparatus is normally operated in a moving image mode. While sensing a moving image, the variable apical angle prism 32 and the timing to read image signals from the CCD are controlled as described above. Further, when a still image mode switch, which is not shown, is turned on, and the aforesaid combining processes are performed on field images which are sensed right after the switch is turned on, then the combined image of the two field images is outputted.

In the third embodiment, a color filter of primary colors arranged in Bayer arrangement is used, and data sensed for the ODD field and data sensed for EVEN field are processed to increase the resolution. However, the present invention is not limited to this, and a color filter of complementary colors arranged in mosaic may be used to achieve the same advantages of the present invention.

FIG. 35 shows an example of an arrangement of color filter chips of a color filter. With this filter, the variable apical angle prism 32 is controlled so that an image formation position on the CCD is shifted by one pixel in the vertical and horizontal directions, namely four shifts make one cycle. In a case where the image formation position also shifts in the vertical direction, it is necessary to also change a timing to read the CCD in the vertical direction.

Furthermore, the timing to read signals from the CCD 33 is controlled in the third embodiment, however, it is possible to compensate the shift when outputting a moving image.

Further, recording method of an output image is not explained in the third embodiment, but the image may be sequentially recorded as image data is outputted from the CCD, or may be recorded after signals from the CCD are converted to the luminance and color signals. Further, it is also possible to record an image of high resolution obtained by combining a plurality of sensed images.

Further, in the third embodiment, a variable apical angle prism is used for shifting the image formation position on a CCD, however, the present invention is not limited to this, and a piezoelectric element may be used for shifting the CCD to control the image formation position on the CCD.

According to the third embodiment as described above, by shifting the image formation position on an image sensing device by a predetermined amount, e.g., a pixel, at a predetermined time interval, such as one field, by using a variable apical angle prism, and reading out signals from the image sensing device at a timing so as to compensate the shifted amount, e.g., a pixel, it is possible to provide an image sensing apparatus capable of sensing a still image as well as sensing a still image and a moving image at the same time at low cost.

The present invention is not limited to the above embodiments and various changes and modifications can be made within the spirit and scope of the present invention. Therefore to appraise the public of the scope of the present invention, the following claims are made.

What is claimed is:

1. An image sensing apparatus which obtains an image of high resolution by using pixel shifting technique, comprising:

image sensing means for sensing an image of an object to obtain image data;

shifting means for shifting image formation position of the image of the object on said image sensing means;

selection means for selecting one of a plurality of image sensing modes each of which performs image sensing operation using different pixel shifting methods wherein said plurality of image sensing modes include a first image sensing mode for performing a first plural number of pixel shifting operations and a second image sensing mode for performing a second plural number of pixel shifting, operations, wherein said second plural number is different from said first plural number; and combining means which combines images of said first plural number in said first image sensing mode and images of said second plural number in said second image sensing mode respectively.

2. The image sensing apparatus according to claim 1, further comprising a color filter.

3. The image sensing apparatus according to claim 2, wherein said plurality of image sensing modes include a fifth mode for sensing images by obtaining image data of different colors of the filter at each image sensing point in a first image sensing point array of said image sensing means, in a second image sensing point array which is shifted by a half pixel in the horizontal direction with respect to the first image sensing point array, in a third image sensing point array which is shifted by a half pixel in the vertical direction with respect to the first image sensing point array, and in a fourth image sensing point array which is shifted by a half pixel both in the horizontal and vertical directions with respect to the first image sensing point array.

4. The image sensing apparatus according to claim 2, wherein said plurality of image sensing modes include a sixth mode for sensing an image in a first image sensing point array of said image sensing means and an image in a second image sensing point array which is shifted by a half pixel in the horizontal direction and by an integer multiple number of half pixel in the vertical direction with respect to the first image sensing point array.

5. The image sensing apparatus according to claim 4, wherein, in said sixth mode, the second image sensing point array is shifted by a half pixel in the vertical direction and shifted by one and half pixels in the horizontal direction with respect to the first image sensing point array.

6. The image sensing apparatus according to claim 2, wherein said plurality of image sensing modes include a seventh mode for sensing images by obtaining image data of different colors of the filter at each image sensing point in a first image sensing point array of said image sensing means by shifting image formation positions on said image sensing means the number of times which is the same as the number of colors used in the color filter by said shifting means.

7. The image sensing apparatus according to claim 2, wherein said plurality of image sensing modes include a eighth mode for sensing an image in a first image sensing point array of said image sensing means and an image in a second image sensing point array which is shifted by an integer multiple number of half pixel in the horizontal direction with respect to the first image sensing point array.

8. The image sensing apparatus according to claim 7, wherein, in said sixth mode, the second image sensing point array is shifted by one and half pixels in the horizontal direction with respect to the first image sensing point array.

9. The image sensing apparatus according to claim 2, wherein said color filter has an arrangement in which each color forms vertical lines, and colors used in the color filter appear in sequence in the horizontal direction.

10. The image sensing apparatus according to claim 2, wherein said color filter has cyan, green and yellow.

11. The image sensing apparatus according to claim 1, wherein said plurality of image sensing modes include a mode for shifting the image formation position by a pixel and a mode for shifting the image formation position by a half pixel.

12. The image sensing apparatus according to claim 1, wherein in each of said plurality of image sensing modes, a different number of images are sensed.

13. The image sensing apparatus according to claim 1, wherein said plurality of image sensing modes include a first mode for sensing an image in a first image sensing point array of said image sensing means, an image in a second image sensing point array which is shifted by a half pixel in the horizontal direction with respect to the first image sensing point array, an image in a third image sensing point array which is shifted by a half pixel in the vertical direction with respect to the first image sensing point array, and an image in a fourth image sensing point array which is shifted by a half pixel both in the horizontal and vertical directions with respect to the first image sensing point array.

14. The image sensing apparatus according to claim 1, wherein said plurality of image sensing modes include a second mode for sensing an image in a first image sensing point array of said image sensing means and an image in a second image sensing point array which is shifted by a half pixel both in the horizontal and vertical directions with respect the first image sensing point array.

15. The image sensing apparatus according to claim 14, wherein image data of the images sensed in said second mode are read out in such a manner that image data sensed in a combined image sensing point array of the first and second image sensing point arrays is read out in different combinations of two adjacent horizontal lines to obtain image data of an even field and image data of an odd field.

16. The image sensing apparatus according to claim 1, wherein said plurality of image sensing modes include a third mode for sensing an image in a first image sensing point array of said image sensing means and an image in a second image sensing point array which is shifted by a half pixel in the horizontal direction with respect to the first image sensing point array.

17. The image sensing apparatus according to claim 1, wherein said plurality of image sensing modes include a fourth mode for sensing an image at a first image sensing point array of said image sensing means.

18. The image sensing apparatus according to claim 1, wherein said shifting means includes a piezoelectric element, and the image formation position on said image sensing means is shifted by shifting said image sensing means.

19. The image sensing apparatus according to claim 1, further comprising a plurality of optical low pass filters which can be freely inserted and extracted to and from light path of the image of the object, wherein said plurality of optical low pass filters are used in accordance with said plurality of image sensing modes.

20. The image sensing apparatus according to claim 1, further comprising:

recording means for recording the image data obtained by said image sensing means into a storage medium; and compression means for compressing the image data in different compression ratio in accordance with a speed of writing and reading of said recording means.

21. The image sensing apparatus according to claim 20, wherein the speed of writing and reading of said recording means is measured between the time when the storage medium is attached to the image sensing apparatus and when an image sensing operation starts.

22. The image sensing apparatus according to claim 20, wherein the compression ratio of the image data obtained by said image sensing means to compressed image data becomes high when the speed of said recording means to write and read to and from a storage medium is slow.

23. The image sensing apparatus according to claim 20, wherein coefficients to be multiplied to the image data of each color are adjusted so that the image data of each color at a white point has a same value before compressing the image data by said compression means.

* * * * *

UNITED STATES PATENT AND TRADEMARK OFFICE
CERTIFICATE OF CORRECTION

PATENT NO.    : 6,195,125 B1
DATED         : February 27, 2001
INVENTOR(S)   : Yoshiro Udagawa et al.

It is certified that error appears in the above-identified patent and that said Letters Patent is hereby corrected as shown below:

<u>Title page,</u>
Item [75], Inventors: the address for Masato Ikeda should read -- Tokyo, Japan --.

<u>Column 4,</u>
Line 7, "20F" should read -- 20E --

Signed and Sealed this

Twelfth Day of November, 2002

Attest:

Attesting Officer

JAMES E. ROGAN
Director of the United States Patent and Trademark Office